(12) United States Patent
Fang et al.

(10) Patent No.: US 12,367,675 B2
(45) Date of Patent: Jul. 22, 2025

(54) MULTI-CAMERA PERSON ASSOCIATION VIA PAIR-WISE MATCHING IN CONTINUOUS FRAMES FOR IMMERSIVE VIDEO

(71) Applicant: Intel Corporation, Santa Clara, CA (US)

(72) Inventors: Longwei Fang, Beijing (CN); Qiang Li, Beijing (CN); Wenlong Li, Beijing (CN); Yikai Fang, Beijing (CN); Hang Zheng, Beijing (CN)

(73) Assignee: Intel Corporation, Santa Clara, CA (US)

( * ) Notice: Subject to any disclaimer, the term of this patent is extended or adjusted under 35 U.S.C. 154(b) by 291 days.

(21) Appl. No.: 17/923,883

(22) PCT Filed: Jul. 30, 2020

(86) PCT No.: PCT/CN2020/105816
§ 371 (c)(1),
(2) Date: Nov. 7, 2022

(87) PCT Pub. No.: WO2022/021217
PCT Pub. Date: Feb. 3, 2022

(65) Prior Publication Data
US 2023/0237801 A1    Jul. 27, 2023

(51) Int. Cl.
*G06T 7/292*    (2017.01)
*G06V 10/26*    (2022.01)
*G06V 20/40*    (2022.01)

(52) U.S. Cl.
CPC .............. *G06V 20/42* (2022.01); *G06T 7/292* (2017.01); *G06V 10/267* (2022.01); *G06V 2201/07* (2022.01); *G06V 2201/12* (2022.01)

(58) Field of Classification Search
CPC .. G06V 20/42; G06V 10/267; G06V 2201/12; G06V 2201/07; G06T 7/292
(Continued)

(56) References Cited

U.S. PATENT DOCUMENTS 10,366,586 B1    7/2019    Leizerovich et al.
2009/0324009 A1    12/2009    Schulz
(Continued)

FOREIGN PATENT DOCUMENTS

CN    103810460    5/2014
EP    2790152    10/2014
(Continued)

OTHER PUBLICATIONS

Y. Xu, A. Osep, Y. Ban, R. Horaud, L. Leal-Taixé, and X. Alameda-Pineda, "How to train your deep multi-object tracker," in Proc. IEEE/CVF Conf. Comput. Vision Pattern Recogn., Jun. 13-19, 2020, pp. 6787-6796.*

(Continued)

*Primary Examiner* — Jin Ge
(74) *Attorney, Agent, or Firm* — Hanley, Flight & Zimmerman, LLC

(57) ABSTRACT

Techniques related to performing object or person association or correspondence in multi-view video are discussed. Such techniques include determining correspondences at a particular time instance based on separately optimizing correspondence sub-matrices for distance sub-matrices based on two-way minimum distance pairs between frame pairs, generating and fusing tracklets across time instances, and adjusting correspondence, after such tracklet processing, via elimination of outlier object positions and rearrangement of object correspondence.

21 Claims, 13 Drawing Sheets

(58) Field of Classification Search
USPC .......................................................... 345/419
See application file for complete search history.

(56) References Cited

U.S. PATENT DOCUMENTS

| | | | |
|---|---|---|---|
| 2016/0188995 | A1 | 6/2016 | Somanath et al. |
| 2017/0345179 | A1* | 11/2017 | Gao .......................... G06T 7/60 |
| 2018/0046865 | A1 | 2/2018 | Chen et al. |
| 2019/0130582 | A1* | 5/2019 | Cheng ....................... G06T 7/11 |
| 2019/0139297 | A1 | 5/2019 | Chen |
| 2019/0180090 | A1 | 6/2019 | Jiang et al. |
| 2019/0188866 | A1* | 6/2019 | Mehrseresht ........... G06T 7/292 |
| 2020/0401793 | A1* | 12/2020 | Leung ................. G06V 10/147 |
| 2021/0256245 | A1 | 8/2021 | Li et al. |

FOREIGN PATENT DOCUMENTS

| | | | | |
|---|---|---|---|---|
| GB | 2557316 | * | 6/2016 | ............. G06T 7/246 |
| JP | 2019121019 A | | 7/2019 | |
| JP | 2019174868 A | | 10/2019 | |
| WO | 2020061792 | | 4/2020 | |

OTHER PUBLICATIONS

International Search Report and Written Opinion for PCT Application No. PCT/CN2020/105816, dated Apr. 26, 2021.
Dong, J., et al., "Fast and robust multi-person 3D pose estimation from multiple views", Proceedings of the IEEE Conference on Computer Vision and Pattern Recognition; pp. 7792-7801, 2019.
Kim, K., et al., "Multi-camera tracking and segmentation of occluded people on ground plane using search-guided particle filtering", European Conference on Computer Vision, Springer, Berlin, Heidelberg, 2006.
Nithin, K., et al., "Multi-camera Tracklet association and fusion using ensemble of visual and geometric cues", 2017.
Sun, K., et al., "Deep high-resolution representation learning for human pose estimation", Proceedings of the IEEE Conference on Computer Vision and Pattern Recognition, 2019.
Sun, Luo, et al., "A Robust Approach for Person Localization in Multi-camera Environment", 2010 International Conference on Pattern Recognition, 4 pgs.
International Preliminary Report on Patentability for PCT Application No. PCT/CN2020/105816, dated Feb. 9, 2023.
Sankoh et al., "Precisely Identified Object Tracking for Rendering Free-viewpoint Video in a Large Outdoor Space such as Soccer Game," Institute of Electronics, Information and Communication Engineers, Technical Report, vol. 36, Issue 29, Jul. 12, 2012, 7 pages [including English Abstract].
Tang et al., "Joint Multi-View People Tracking and Pose Estimation for 3D Scene Reconstruction," Proceedings of the IEEE International Conference on Multimedia and Expo, Jul. 23, 2018, 6 pages.
Japan Patent Office, "Search Report," issued in connection with Japanese Application No. 2022-577486, dated May 20, 2024, 40 pages [including English translation].
Japan Patent Office, "Notice of Reasons for Refusal," issued in connection with Japanese Application No. 2022-577486, dated Jun. 4, 2024, 4 pages [including English translation].
Indian Patent Office, "Examination Report," issued in connection with Indian Patent Application No. 202247074006, dated Mar. 27, 2025, 6 pages.

* cited by examiner

FIG. 5

|  | A1 | A2 | A3 | B1 | B2 | B3 | C1 | C2 | C3 |
|---|---|---|---|---|---|---|---|---|---|
| A1 | | | | | | | | | |
| A2 | | | | | | | | | |
| A3 | | | | | | | | | |
| B1 | | | | | | | | | |
| B2 | | | | | | | | | |
| B3 | | | | | | | | | |
| C1 | | | | | | | | | |
| C2 | | | | | | | | | |
| C3 | | | | | | | | | |

FIG. 6

|  | B1 | B2 | B3 |
|---|---|---|---|
| A1 | 22 | 2 | 11 |
| A2 | 6 | 14 | 8 |
| A3 | 10 | 8 | 3 |

FIG. 7

|  | A1 | A2 | A3 | A4 | A5 | A6 |
|---|---|---|---|---|---|---|
| B1 | 10.5 | 20.7 | 0.36 | 8.9 | 30.1 | 27 |
| B2 | 0.85 | 18.3 | 4.75 | 12.3 | 6.7 | 33 |
| B3 | 33 | 27 | 15 | 2.2 | 11.3 | 8.9 |
| B4 | 12.4 | 6.73 | 37.3 | 21.8 | 22.9 | 7.77 |
| B5 | 2.4 | 24.6 | 13.7 | 12.9 | 0.49 | 22.2 |
| B6 | 29.71 | 1.58 | 17.3 | 33.5 | 17.4 | 11.7 |

MULTI-CAMERA PERSON ASSOCIATION VIA PAIR-WISE MATCHING IN CONTINUOUS FRAMES FOR IMMERSIVE VIDEO

CLAIM OF PRIORITY

This Application is a National Stage Entry of, and claims priority to, PCT Application No. PCT/CN2020/105816, filed on 30 Jul. 2020 and titled "MULTI-CAMERA PERSON ASSOCIATION VIA PAIR-WISE MATCHING IN CONTINUOUS FRAMES FOR IMMERSIVE VIDEO", which is incorporated by reference in its entirety for all purposes.

BACKGROUND

In immersive video and other contexts such as computer vision applications, a number of cameras are installed around a scene of interest. For example, cameras may be installed in a stadium around a playing field. Using video attained from the cameras, a 3D model (e.g., via a point cloud volumetric model or other representation) is generated for the scene for each time instance of the video. A photo realistic view from a virtual view within the scene may then be generated to provide an immersive experience for a user. In particular, such techniques allow a virtual camera to navigate in the 3D space to replay action from the scene at any location and from any perspective or angle within the scene.

Tracking the people (e.g., players) in the scene (e.g., field or court) is a key component for controlling the virtual camera automatically while associating the same person from different camera views together is a complex issue in multiple player tracking algorithms. Multiple camera player association integrates the detection and tracking of bounding boxes of the same person together from different cameras at the same timestamp.

There are several challenges to providing stable and accurate associations from multiple cameras. First, the detection result from each camera is not perfectly reliable. Bounding box misses are common in detection, especially when players are crowded together and occlusions occur. For example, one bounding box may cover more than one person (e.g., more than three people), which causes the number of peopled to be reduced in association. Second, detected bounding boxes are unstable in continuous frames. Specifically, two adjacent frames may have different numbers of bounding box, which causes discontinuous association locations in adjacent frames. Third, the image of the same person in different cameras may have large variations. Different perspectives and person overlaps make matching difficult. Furthermore, there is a strong restriction on execution time for real-time processing.

Current techniques for associations from multiple cameras include geometric constraint based techniques and trajectory fusion based techniques. Geometric constraint techniques are typically used on single frame association while trajectory fusion techniques are commonly used in continuous frame association. Furthermore, current techniques may combine geometry constraints, human key points, and player re-identification features together to perform multi-view matching by building a similarity matrix from geometry constraints and re-identification and using a convex optimization to optimize the similarity matrix to get a best association. Also, tracking associations may be modeled as an optimization task by assembling appearance, motion, and geometry information. However such techniques have limitations. For geometric constraint techniques, only a single frame information is used and thus jittering occurs in continuous frames. Some techniques use a global optimization strategy to optimize association results, however such techniques are time consuming and cannot be performed in real-time. Current tracking fusion methods depend on single camera tracking, which disadvantageously generates frequent identification switching in crowded cases such as sporting applications. Furthermore, such techniques are complex and again are not available for real-time application.

It is desirable to provide multi-camera person or object association in continuous frames in real-time with high accuracy and stability. It is with respect to these and other considerations that the present improvements have been needed. Such improvements may become critical as the desire to provide new and immersive user experiences from multi-view video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 5 illustrates an example distance matrix;

FIG. 6 illustrates an example bounding box pairing using two-way minimum distances;

FIG. 7 illustrates another example bounding box pairing using two-way minimum distances;

DETAILED DESCRIPTION

Figure 1:
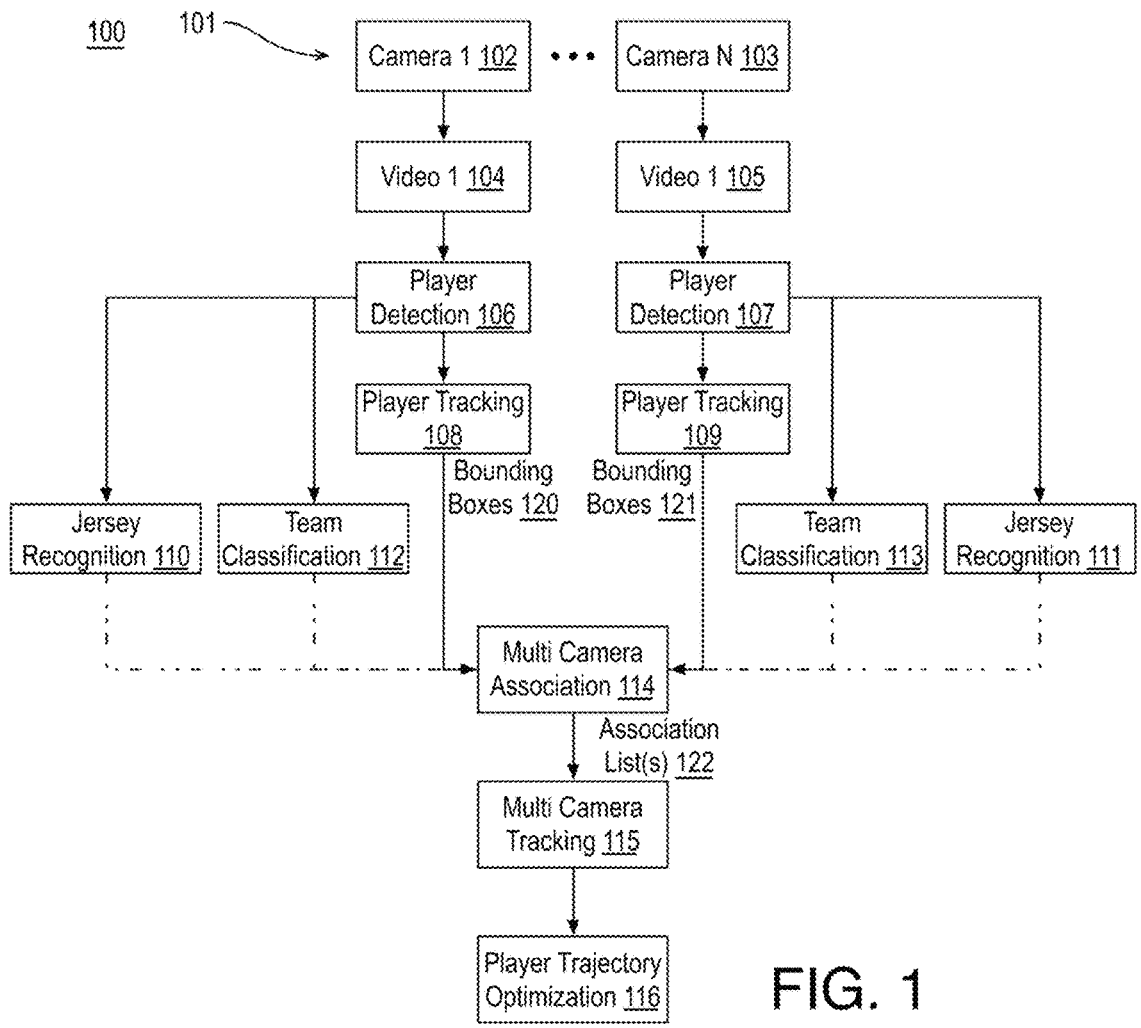
FIG. 1 illustrates an example system for tracking players within a multi-camera environment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to providing multi-camera or multi-view person or object association in continuous frames.

As described above, it is advantageous to provide multi-camera person or object association in continuous frames in real-time with high accuracy and stability perform. The techniques discussed herein perform multi-camera association via pair-wise matching through continuous frames. Such techniques first perform association frame by frame and then implement multi-frame location tracking results to refine the association. For example, for each time instance, a distance matrix across all camera views is generated in a pair-wise manner. Then, the association of players is determined by optimization of the distance matrix. To run in real-time, a hard constraint is provided prior to such optimization to substantially reduce the search space. After such association is provided for several frames (e.g., association results are generated for several continuous frames), location tracking is performed based on the current association based on tracking, interpolating, and merging to generate a continuous player location and a stable player number across time instances. Based on the aforementioned player number and location, bounding box rearrangement and removal is then performed to further refine the error matching across the time instances.

FIG. 1 illustrates an example system 100 for tracking players within a multi-camera environment, arranged in accordance with at least some implementations of the present disclosure. As shown in FIG. 1, system 100 includes a camera array 101 having any number, N, of cameras including camera 102 and camera 103. Each camera generates corresponding video including video 104 and video 105. Player detection modules including player detection modules 106, 107 detect players within the captured video and player tracking modules including player tracking modules 108, 109 track such detected players to generate bounding boxes including bounding boxes 120, 121. Although discussed herein with respect to player detection, tracking, association, and so on for the sake of clarity of presentation. The techniques may be applied to any people, animals, objects, or combinations thereof. Notably, in the context of sporting events, such player tracking is inclusive of tracking referees.

Figure 2:
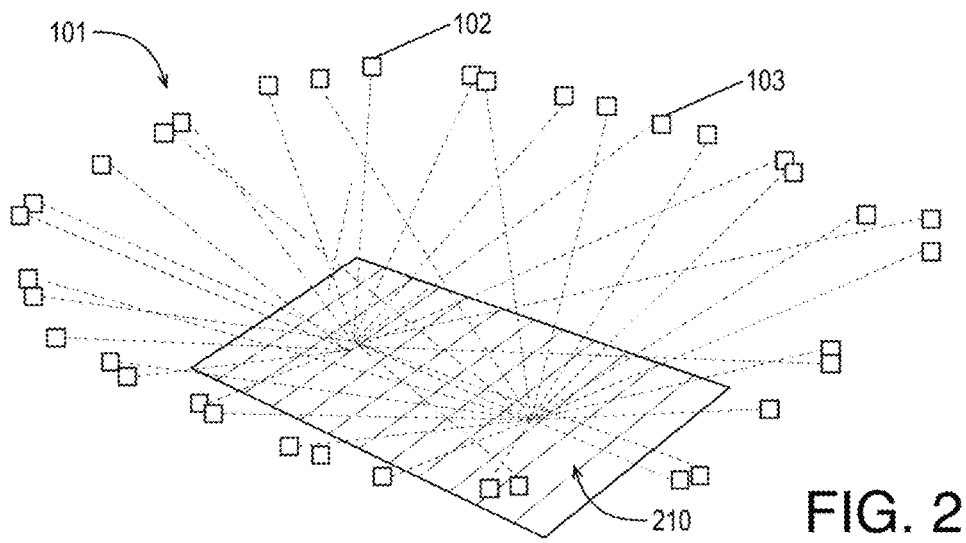
FIG. 2 illustrates an example camera array trained on an example scene.

FIG. 2 illustrates an example camera array 101 trained on an example scene 210, arranged in accordance with at least some implementations of the present disclosure. In the illustrated embodiment, camera array 101 includes 36 cameras trained on a sporting field. However, camera array 101 may include any suitable number of cameras trained on scene 210 such as not less than 15 cameras. For example, camera array 101 may be trained on scene 210 to generate a 3D model of scene 210 and fewer cameras may not provide adequate information to generate the 3D model. Camera array 101 may be mounted to a stadium (not shown) surrounding the sporting field of scene 210 and along the ground surrounding the sporting field, calibrated, and trained on scene 210 to capture simultaneous video frames of scene 210. As shown, each camera of camera array 101 has a particular view of scene 210. For example, camera 102 has a first view of scene 210 and camera 103 has a second view of a scene and so on. As used herein, the term view indicates the image content of an image plane of a particular camera of camera array 101 or image content of any view from a virtual camera located within scene 210. Notably, the view may be a captured view (e.g., a view attained using image capture at a camera) such that multiple views include representations of the same person, object, entity, etc.

Returning to FIG. 1, as shown, per camera or view processing generates bounding boxes including bounding boxes 120, 121. Bounding boxes 120 may include any data structure representative of or indicating the bounding boxes for detected and tracked players within some or all of the frames of video 105. For example, bounding boxes 120 may include data representative of the location and size of each bounding box within each frame, every other frame, every third frame or the like. Bounding boxes 121 include similar data for video 105. Any number of per-view or per-camera bounding boxes or bounding box data are provided to a multi-camera association module 114 for processing as discussed herein to generate association lists 122 that indicate matching bounding boxes that have been deemed to include the same player. Association lists 122 may include a list or lists having any suitable data structure to indicate such association or correspondence. For example, each bounding box may be indexed within each frame from each view at a particular time instance (e.g., 36 occurrences of indexed bounding boxes) and association list 122, for the time instance, may list the index of the bounding box in each from corresponding to a particular player. In some embodiments, multi-camera association module 114 further receives jersey recognition data from jersey recognition modules including jersey recognition modules 110, 111 and team classification data from team classification modules including team classification modules 112, 113 and each player may be further identified by team (e.g., home or away) and player number. For example, association list 122 may include an entry for home player number 5 indicating each bounding box for that player in each view available from camera array 101, an entry for away player number 12 indicating each bounding box for that player in each view available from camera array 101, and so on for all identified players or persons. Furthermore a like list may be generated at each time instance or time stamp of captured frames, for every other time instance, or the like.

As shown, the association lists 122 are provided to optional multi-camera tracking module 115 and player trajectory optimization module 116 that combine the player information in the temporal and spatial domain to provide player trajectories and further track and optimize player trajectories to provide smooth and robust output for use by system 100. Notably, with reference to FIG. 2, a desired virtual camera within scene 210 may be managed to follow key players to generate eventual the volumetric video (e.g., a point cloud representation or other data structure). The pipeline of such player tracking as shown in FIG. 1 begins with single camera player detection and tracking. Then, team classification and jersey recognition is provided for each detected player. Such data is provided to multi-camera association module 114 to associate or provide correspondence for players from different views of the scene. Multi-camera tracking is applied to fuse all the player information (e.g., team, jersey) together in temporal and spatial domain to generate the player trajectory, which is followed by player trajectory optimization (PTO) to provide a smooth and accurate output for use by system 100. The techniques discussed herein focus is on providing accurate and real-time multi-camera association results. As discussed, an input inclusive of tracking bounding boxes as generated by all camera views is provided and an output inclusive of an association list or lists that provides same player bounding boxes in all the camera views is generated.

Figure 3:
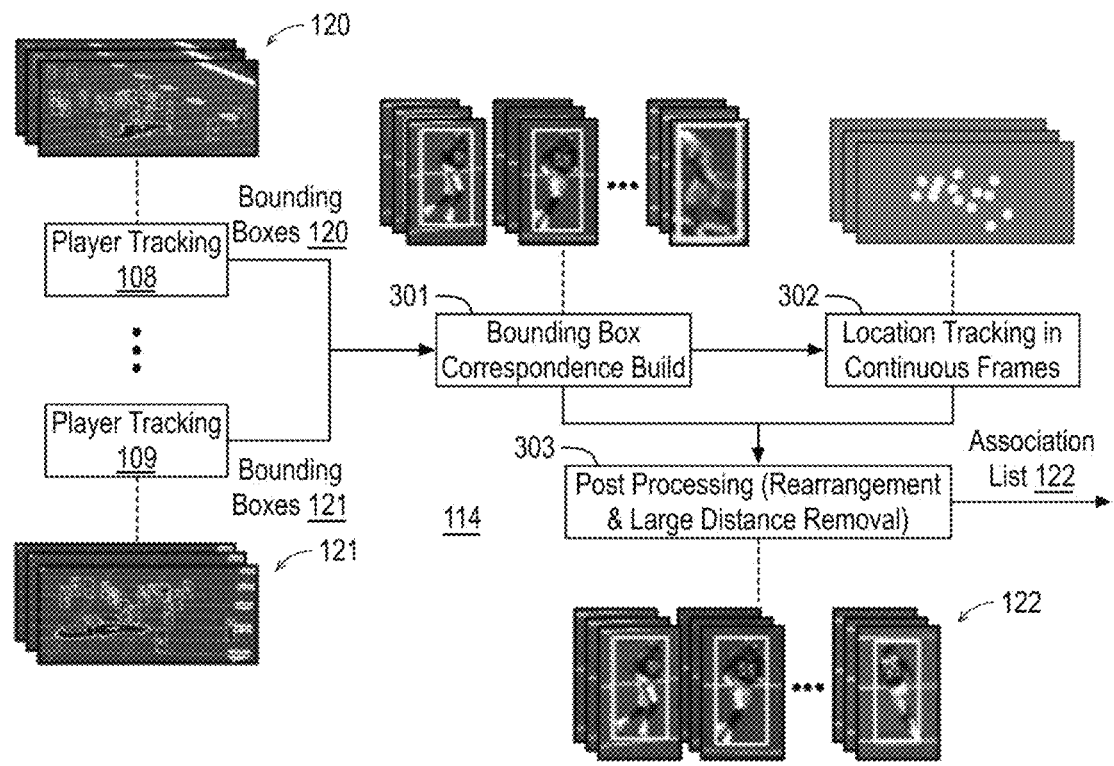
FIG. 3 illustrates an example multi-camera association module for generating object associations using pair-wise matching in continuous frames.

FIG. 3 illustrates an example multi-camera association module 114 for generating object associations using pair-wise matching in continuous frames, arranged in accordance with at least some implementations of the present disclosure. As discussed, multi-camera association module 114 receives bounding box data such as bounding box data 120, 121 from respective player tracking modules 108, 109. As shown, in some embodiments, multi-camera association module 114 includes a bounding box correspondence build module 301, a location tracking in continuous frames module 302, and a post processing module 303. With respect to location tracking in continuous frames module 302, locations are tracked across time instances, which may also be referred to as continuous time frames or simply continuous frames. However such time frames are not to be confused with video frames or video images, which are generated by each camera at each time instance.

In some embodiments, the multi camera association problem is addressed by using a continuous time stamp buffer. In some embodiments, pair-wise matching with a hard constraint is used to build correspondence between bounding box pairs. Such techniques significantly reduce the association complexity at each time frame such that the techniques can operate in real-time. Furthermore, location tracking and merging techniques based on association results in the 2D ground plane are employed to maintain a stable player location and player number. Such techniques provide stable and accurate locations and tracking. Also, the association results are refined based on the tracking result for association error correction. The system and techniques discussed herein generate stable and accurate association results in real-time.

In some embodiments, the employed pipeline is divided into two parts: association and post processing. Association matches the same player from different camera views. Post processing refines the association results through heuristic techniques for increased stability and accuracy. For example, the association portion may be provided by bounding box correspondence build module 301 and location tracking in continuous frames module 302 and the post processing may be provided by post processing module 303, which as indicated provides association result rearrangement and large distance removal. As discussed, the input to multi-camera association module 114 is the tracking bounding box generated from all the camera views and the output is association list(s) 122 that contains the same player bounding box in all camera views.

Bounding box correspondence build module 301 receives bounding box data 120, 121, which indicates, for each corresponding video frame at a particular time instance, the number of bounding boxes, the location of each bounding box in the video frame, and the size of each bounding box. That, a number of bounding boxes, a location of each bounding box in the video frame, and a size of each bounding box is provided for each view of scene 210.

Notably, the player in each bounding box may be viewable from many or all views of scene 210 and, therefore, the bounding boxes correspond as including the same player. The techniques discussed herein attempt to associate such bounding boxes across all such views (e.g., within the video frames).

In some embodiments, the location of each such bounding box on a ground plane in the 3D space is determined and used for correspondence. The location of each bounding box on the ground plane may be generated using any suitable technique or techniques. In some embodiments, the distance of foot points for different bounding boxes are used as the constraint to build the correspondence of bounding boxes.

Figure 4:
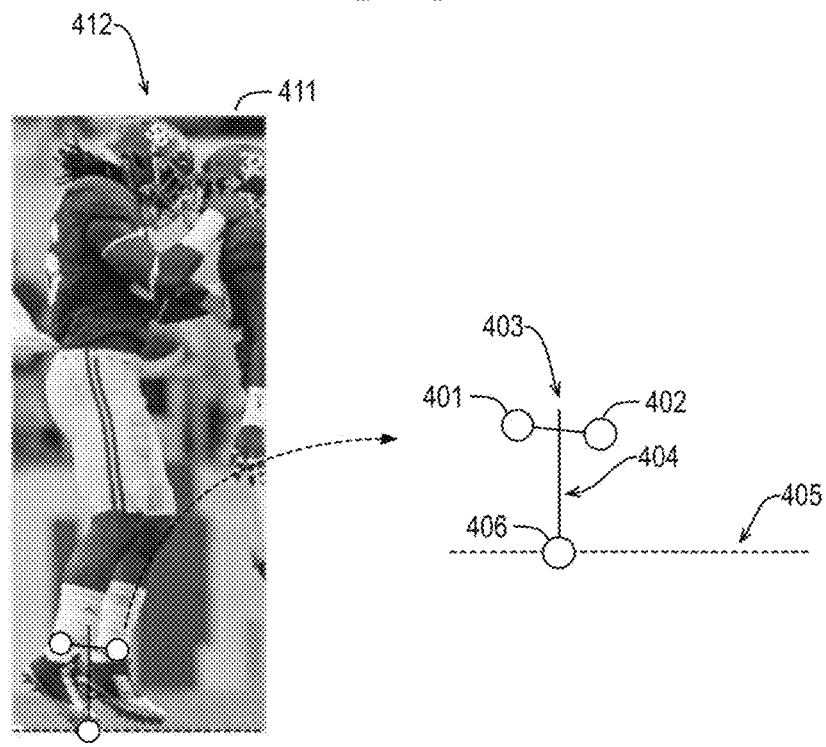
FIG. 4 illustrates an example determination of a location of a bounding box and corresponding player using an estimated foot point.

FIG. 4 illustrates an example determination of a location of a bounding box and corresponding player using an estimated foot point, arranged in accordance with at least some implementations of the present disclosure. As shown, for a bounding box 411 having a corresponding player 412, a foot point 406 (which also may be characterized as a bounding box location or position, player location or position, a foot position or location, or the like) may be determined based on ankle points 401, 402, and a bounding box bottom line 405. In some embodiments, foot point 406 is generated as the intersection of bounding box bottom line 405 and a perpendicular line 404 perpendicular to bounding box bottom line 405 and extending to a center position 403 (or halfway position) between ankle points 401, 402. For example, a middle center point characterized as foot point 406 may be used as a representative position of bounding box 411 and player 412 in the 3D global coordinate system applied to scene 210 (not shown) Notably, foot points of the same player from different camera views will overlap in global coordinate system. As shown, the intersection point of bounding box bottom line 405 and perpendicular line 404, which extends through center position 403 of ankle points 401, 402 of player 412 is used as a replacement for a bounding box bottom line center for improved accuracy. Ankle points 401, 402 may be determined using any suitable technique or techniques. In some embodiments, a deep high resolution representation network for human pose estimation is employed to determine ankle points 401, 402.

Each foot point 406 (e.g., one for each bounding box in each video frame corresponding to each view) is then projected all foot points from the respective camera view to a ground plane of the 3D coordinate system using the projection matrices for the camera views (e.g., the projection matrices to translate from the video frame to the 3D coordinate system). Those projection points represent the players locations in the court from different views.

Returning to FIG. 3, based on such techniques, bounding box correspondence build module 301 generates a location on the ground plane of the 3D coordinate system for each bounding box in each video frame at each time instance. Bounding box correspondence build module 301 then determines correspondences between the bounding boxes using such locations and the distances therebetween (at each time instance or time frame) as follows.

Assuming camera array 101 includes M cameras and each video frame (for each camera view) has $N_m$ bounding boxes, a foot distance between each combination of bounding boxes between every pair (e.g., each available pairing) of video frames (or camera views) is determined and provided in a distance matrix. For example, for each two camera view pair i and j, a distance matrix, $A_{ij} \in R^{N_i \times N_j}$, of dimension $N_i \times N_j$, is generated such that each entry indicates a distance between a pair (or combination) of bounding boxes such that one bounding box is in the first video frame and the other bounding box is in the second video frame. Each of such view pair distance matrices may be combined into an overall distance matrix. Furthermore, the correspondence between bounding boxes between the paired frames may be represented by a partial permutation matrix, $P_{ij} \in \{0,1\}^{N_i \times N_j}$, where each entry of the partial permutation matrix is zero (indicating the bounding boxes do not correspond) or one (indicating the bounding boxes do correspond and therefore represent the same player). The partial permutation matrix should satisfy the doubly stochastic constraints as indicated by Equation (1):

$$0 \leq P_{ij} 1 \leq 1, 0 \leq P_{ij}^T 1 \leq 1 \qquad (1)$$

For all M cameras in camera array 101, a total of $$N = \sum_{m=1}^{M} N_m$$

tracked bounding boxes are included in all video frames (or camera views). Therefore, as discussed an overall distance matrix inclusive of all distance combinations may be generated and a corresponding correspondence matrix may be provided as shown in Equation (2)

$$P = \begin{bmatrix} P_{11} & \cdots & P_{1N} \\ \vdots & \ddots & \vdots \\ P_{N1} & \cdots & P_{NN} \end{bmatrix} \qquad (2)$$

where P is the correspondence matrix and $P_{ii}$ should be identity. Furthermore the build correspondence should satisfy the constraint shown in Equation (3):

$$\text{rank}(P) \leq s, P \geq 0 \qquad (3)$$

where s is the number of players in scene 210 and rank is the dimension of the vector space spanned by the columns of the correspondence matrix. The problem of associating multi-camera view players can be represented as taking the overall distance matrix or, simply, distance matrix, A, as input and outputting an optimal correspondence matrix, P, that minimizes the full distance matrix. As the number of players, s, is unknown, the following objective function can be optimized to estimate the low rank and semi-definite correspondence matrix, P, as shown in Equation (4):

$$f(P) = -\sum_{i=1}^{M} \sum_{j=1}^{M} \langle A_{i,j}, P_{i,j} \rangle + \lambda \cdot \text{rank}(P) \qquad (4)$$

where <·> provides an inner product and A is a weight of the low rank constraint. Equation (4) provides an object function for optimization to determine a correspondence matrix (or correspondence sub-matrix) for a corresponding distance matrix (or distance sub-matrix).

As discussed, camera array 101 may include any number of cameras such as not less than 15 cameras. For example, in a football game employing 18 cameras, each view is expected to include 22 players and three referees. In such contexts, the determination of the correspondence matrix is too time consuming to be performed in real-time. In some embodiments, to reduce computational complexity and allow real-time application, a hard constraint is employed to break the matrices into sub-matrices that can be optimized separately. For example, for the distance matrix (and correspondence matrix) having dimensions of $N_i \times N_j$, for each camera (or view) pair, the correspondence is built (e.g., evaluated) only when bounding box j is the minimal distance from bounding box i and, at the same time, i has the smallest distance to j. That is, for an example bounding box i in a first video frame (or first view), a smallest distance bounding box in a second video frame (or second view) is determined (from all available bounding boxes in the second video frame). Assuming that the minimum distance bounding box in the second video frame (or second view) is j, a correspondence is declared between i and j only if the smallest distance bounding box in the first video frame (or first view) from j is also i.

After generation of such hard constraint correspondences, the distance matrix can be rewritten as a diagonal matrix as shown in Equation (5):

$$\hat{A} = \begin{bmatrix} \overline{A}_{aa} & \cdots & 0 \\ \vdots & \ddots & \vdots \\ 0 & \cdots & \overline{A}_{kk} \end{bmatrix} \quad (5)$$

where $\overline{A}_{ii}$, i=1, 2, ..., k is the sub-matrix. By replacing A in Equation (4) with each $\overline{A}_{ii}$, each sub-matrix can be solved separately in a small search space. Continuing the football game example, the maximum number of players in a sub-matrix is five, while in the original matrix is more than 20. Thereby, the dimension of the new distance matrix is much smaller than the original one. The searching space before optimization is $N^2$, which can be reduced to less than $(N/4)^2$ after application of the discussed distance constraint allowing for reduced computational complexity and reduced processing time inclusive of real-time application.

FIG. 5 illustrates an example distance matrix 500, arranged in accordance with at least some implementations of the present disclosure. In the example, a context inclusive of three cameras (or video frames or views) and three bounding boxes per camera is presented for the sake of clarity of presentation. As discussed herein, any number of cameras (e.g., about 15 to 40 cameras) and any number of detected bounding boxes per camera (e.g., about 15 to 25) may be employed. Furthermore, distance matrix 500 is generated by determining distances between bounding boxes of video frames by pairing each combination of video frames as discussed herein and distance matrix 500 may be described as an overall or aggregate distance matrix for a particular time instance. Notably, distance matrix 500 may be generated for any or all time instances of video frames.

In the example of FIG. 5, three cameras are employed: A, B, and C. Furthermore, each camera contains three bounding boxes: 1, 2, 3. Therefore, camera A has three bounding boxes A1, A2, A3, camera B has three bounding boxes B1, B2, B3, and so on. As discussed, in general, distance matrix 500, $A_{ij} \in R^{N_i \times N_j}$, has dimensions of $N_i \times N_j$. In this example, distance matrix 500 has dimensions of 9×9. In distance matrix 500, each grid box such as grid boxes 501, 502 includes or represents a distance along the ground plane in the 3D coordinate systems between the pertinent bounding box foot locations. For example, grid box 501 represents the distance between the foot position of bounding box C3 (the third bounding box in camera view C) and the foot position of bounding box A1 (the first bounding box in camera view A), grid box 502 represents the distance between the foot position of bounding box B2 (the second bounding box in camera view B) and the foot position of bounding box A3 (the third bounding box in camera view A), and so on.

As discussed, a correspondence matrix in analogy to distance matrix 500 is generated to determine correspondences between bounding boxes such that for each position of distance matrix 500, a value of one (indicating correspondence) or zero (indicating no correspondence) is provided in the correspondence matrix. Furthermore, as discussed, optimization of the correspondence matrix based on application of Equation (4) using the entirety of distance matrix 500 is too time consuming and computationally intensive for real-time application. Instead, a hard constraint is applied to break distance matrix 500 (and the correspondence matrix) into smaller sub-matrices and such sub-matrices are solved separately to determine the correspondence.

In some embodiments, employing the hard constraint includes building correspondence only when a two-way minimum distance is determined. That is, for all camera pairs, a bounding box pair flag is set between bounding boxes of differing camera views in response to the bounding box in the first view having the smallest distance from the bounding box in the second view and vice versa correspondence.

FIG. 6 illustrates example bounding box pairing 600 using two-way minimum distances, arranged in accordance with at least some implementations of the present disclosure. In the example of FIG. 6, bounding box pairing between camera A and camera B is illustrated for the sake of clarity of presentation. In the example, each grid box includes a distance along the ground plane in a 3D coordinate system between the foot points of the bounding boxes. As shown, the distance between the first bounding box in camera view A and the second bounding box in camera view B is 2 units (e.g., the distance from A1 to B2 is 2 units), and so on. To determine a pair of bounding boxes having two-way minimum distance, beginning at bounding box A1 it is seen that the minimum distance bounding box in view B2 at a distance of 2 units. For A1 and B2 to pair using two-way minimum distances, bounding box A1 must also be the minimum distance bounding box in view A for bounding box B2, which it is in this case. Such processing continues for each bounding box to determine two-way minimum distance flags 601, 602, 603 that pair bounding boxes A1 and B2, A2 and B1, and A3 and B3.

FIG. 7 illustrates another example bounding box pairing 700 using two-way minimum distances, arranged in accordance with at least some implementations of the present disclosure. In the example of FIG. 7, two camera views A and B are again used but the number of bounding boxes in each view is now six such that camera view A has bounding boxes A1, A2, A3, A4, A5, and A6 and camera view B has bounding boxes B1, B2, B3, B4, B5, and B6. It is noted that in FIG. 7 not all two minimum distance pairs are illustrated for the sake of clarity of presentation. In this example, processing continues as discussed with respect to FIG. 6. In particular, with respect to bounding box A4, a minimum distance bounding box in view A is determined as bounding box B3 (with a distance of 2.2 units) as it is the smallest distance in column A4. For two-way pair to be established, bounding box A4 must also be the minimum distance bounding box in view B for bounding box A4, which it is as it is the smallest distance in row B3. Continuing with the processing of bounding box A6, bounding box B4 is the smallest distance bounding box in view B (with a distance of 7.77 units) as it is the smallest distance in column A6. However, a two-way pairing is not established because bounding box A6 is not the smallest distance bounding box for bounding box B4 in view A. Instead, the smallest distance bounding box for bounding box B4 in view A is bounding box A2 (with a distance of 6.73 units) as it is the smallest distance in row B4. Therefore, a two-way minimum distance flag 701 is provided to pair bounding boxes A4 and B3 but no pairing flag is provided for grid box 702.

Notably, for the distance matrix of dimensions $N_j \times N_i$ of each camera pair, the correspondence is built only when j (e.g., a bounding box index in camera view B) is the minimum distance to i (e.g., a bounding box index in camera view A), while at the same time, i has the minimum distance to j. As shown in FIGS. 7, A4 and B3 are a correspondence pair while A6 and B4 are not a correspondence pair. Using the discussed two way distance flags (e.g., correspondence pairs), distance matrix 500 is then transformed and divided into sub-matrices for determination of final correspondences.

Figure 8:
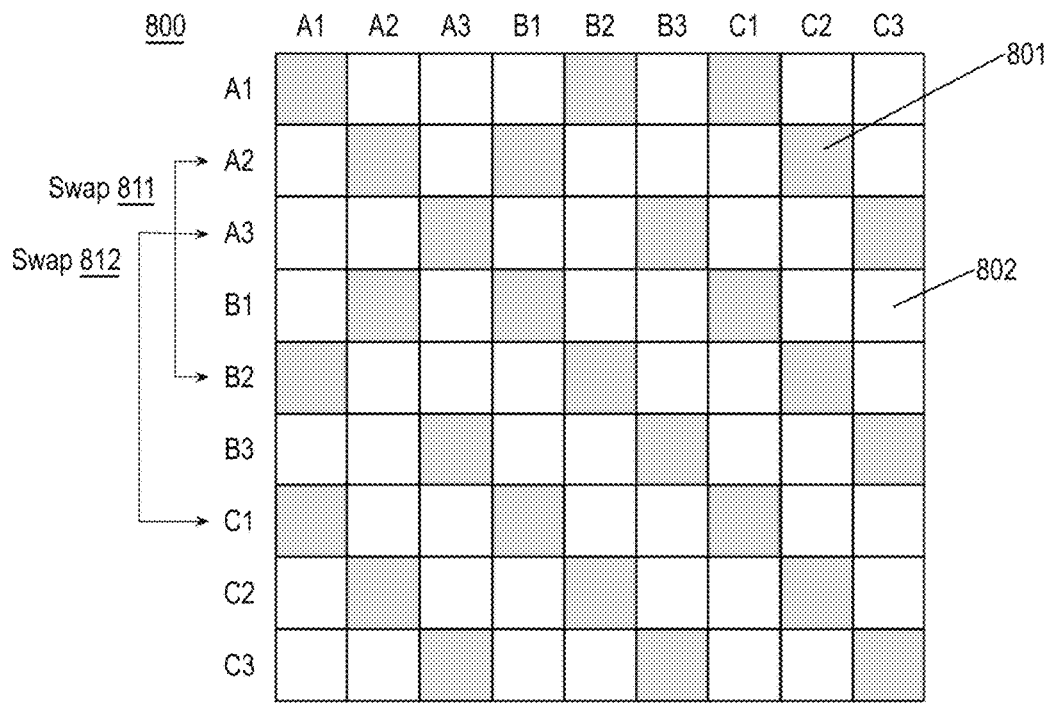
FIG. 8 illustrates an exemplary two-way minimum distance flag matrix and row-wise matrix transformations.

FIG. 8 illustrates an exemplary two-way minimum distance flag matrix 800 and row-wise matrix transformations 811, 812, arranged in accordance with at least some implementations of the present disclosure. In FIG. 8, grid boxes having shading indicate two-way minimum distance correspondences as shown with respect to grid box 801 (e.g., bounding boxes A2 and C2 are correspondence pair indicated by a flag in grid box 801) while grid boxes absent shading indicate no such flag as shown with respect to grid box 802 (e.g., bounding boxes B1 and C3 are not paired). As shown in FIG. 8, bounding box A1 is paired with bounding boxes B2 and C1. In response thereto, the matrices (e.g., distance matrix 500 and the correspondence matrix) are transformed, according to elementary matrix transforms 811, 812 (each labeled swap) to move the row corresponding to bounding boxes B2 and C1 directly under the row corresponding to bounding box A1.

Figure 9:
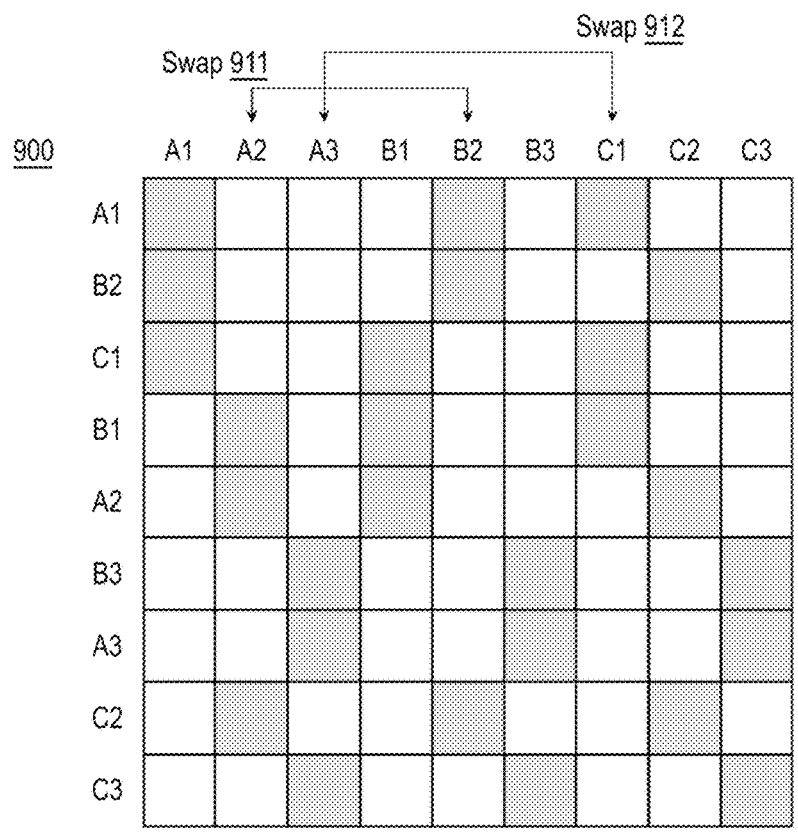
FIG. 9 illustrates a resultant matrix from the row-wise transformations.

FIG. 9 illustrates a resultant matrix 900 from the row-wise transformations, arranged in accordance with at least some implementations of the present disclosure. As shown in FIG. 9, rows B2 and A2 have been swapped as have columns C1 and A3 to merge correspondences toward an upper left corner of the matrices. Furthermore, FIG. 9 illustrates column-wise matrix transformations 911, 912 analogous to row-wise matrix transformations 811, 812 to move the column corresponding to bounding boxes B2 and C1 directly adjacent the column corresponding to bounding box A1. Such elementary transformations again merge correspondences toward an upper left corner of the matrices.

Figure 10:
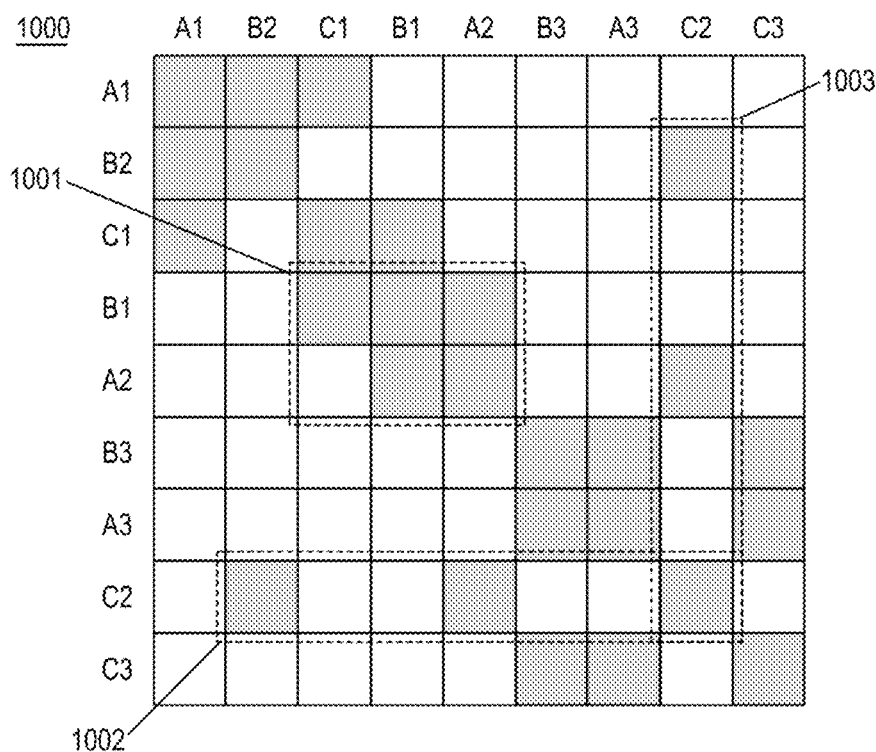
FIG. 10 illustrates a resultant matrix from the column-wise transformations.
Figure 11:
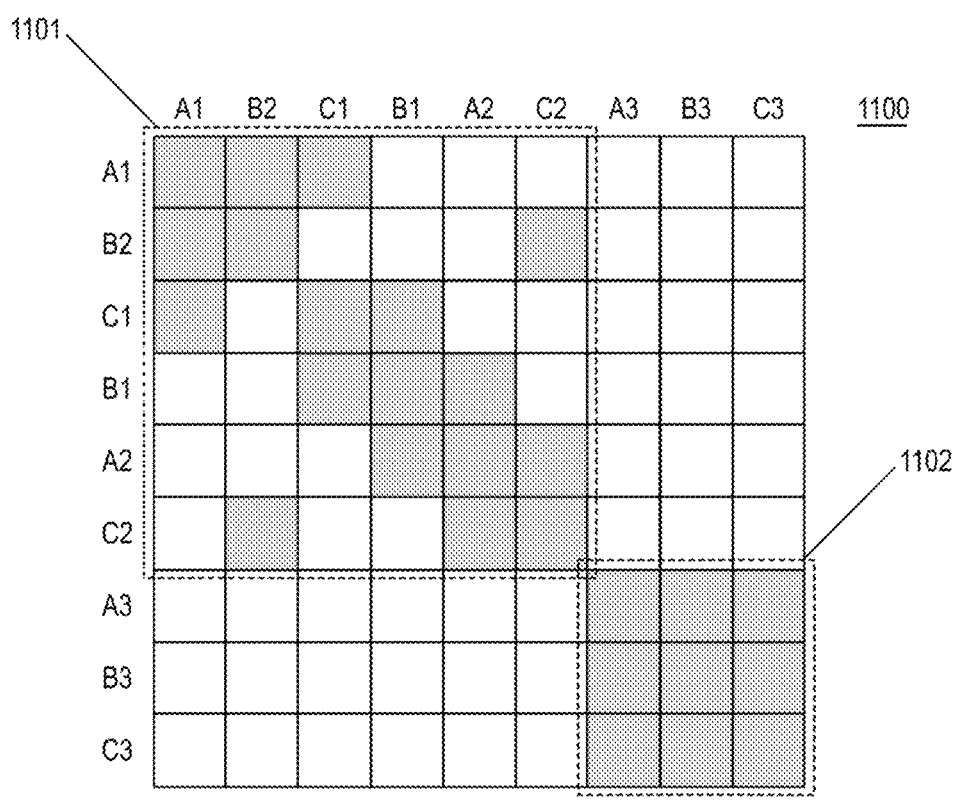
FIG. 11 illustrates a resultant matrix after continuing row-wise and column-wise transformations and exemplary sub-matrices.

FIG. 10 illustrates a resultant matrix 1000 from the column-wise transformations, arranged in accordance with at least some implementations of the present disclosure. As shown in FIG. 10, columns B2 and A2 have been swapped as have columns C1 and A3 to merge correspondences toward an upper left corner of the matrices. Furthermore, FIG. 10 illustrates bounding box B2 not only has a correspondence with bounding box A1 but bounding box B2 also has a correspondence with bounding box C2. Furthermore, bounding box C2 has a correspondence with bounding box A2 as shown with respect to boxes 1002, 1003. Responsive to such correspondences, the column corresponding to bounding box C2 and the row corresponding to bounding box C2 are moved using continuing elementary transforms to positions after the correspondences in box 1001 (e.g., correspondences of bounding boxes B1 and C1 and bounding boxes A2 and B1).h FIG. 11 illustrates a resultant matrix 1100 after continuing row-wise and column-wise transformations and exemplary sub-matrices, arranged in accordance with at least some implementations of the present disclosure. As shown in FIG. 11, column C2 has been swapped with column B3 and, likewise, row C2 has been swapped with column B3 to further merge correspondences toward an upper left corner of the matrices. After formation of resultant matrix 1100, the resultant sub-matrices 1101, 1102 of resultant matrix 1100 are solved separately as via separate application of Equation (4) as discussed above. In the example of FIG. 11, resultant matrix 1100 is separated into two sub-matrices 1101, 1102. However, resultant matrix 1100 may be separated into any number of sub-matrices having groupings of correspondences such as 3, 4, 5, or more sub-matrices.

Returning to FIG. 3, bounding box correspondence build module 301 separately solves for the correspondence sub-matrices to generate correspondences at each time instance. The correspondence data indicates the bounding boxes between video frames at the time instance that correspond such that they are deemed to include the same player.

Such correspondence data is provided to location tracking in continuous frames module 302. As discussed, player detection in each camera view may not be stable, which leads to inconsistent detection results in adjacent frames (e.g., detection bounding box number is not same even there is no player movement). For example, the associated bounding boxes may change in temporally adjacent frames, which leads to unstable player location, missing players, or player duplication. To resolve such limitations, a multi-frame buffer (e.g., multiple time frame buffer) is employed to predict player location and number. In some embodiments, two phases are utilized: player tracklets generation and player tracklets fusion. Notably, tracklets generation involves connecting the same player from different time frames together while tracklets fusion involves merging redundant tracklets and deleting false tracklets.

Figure 12:
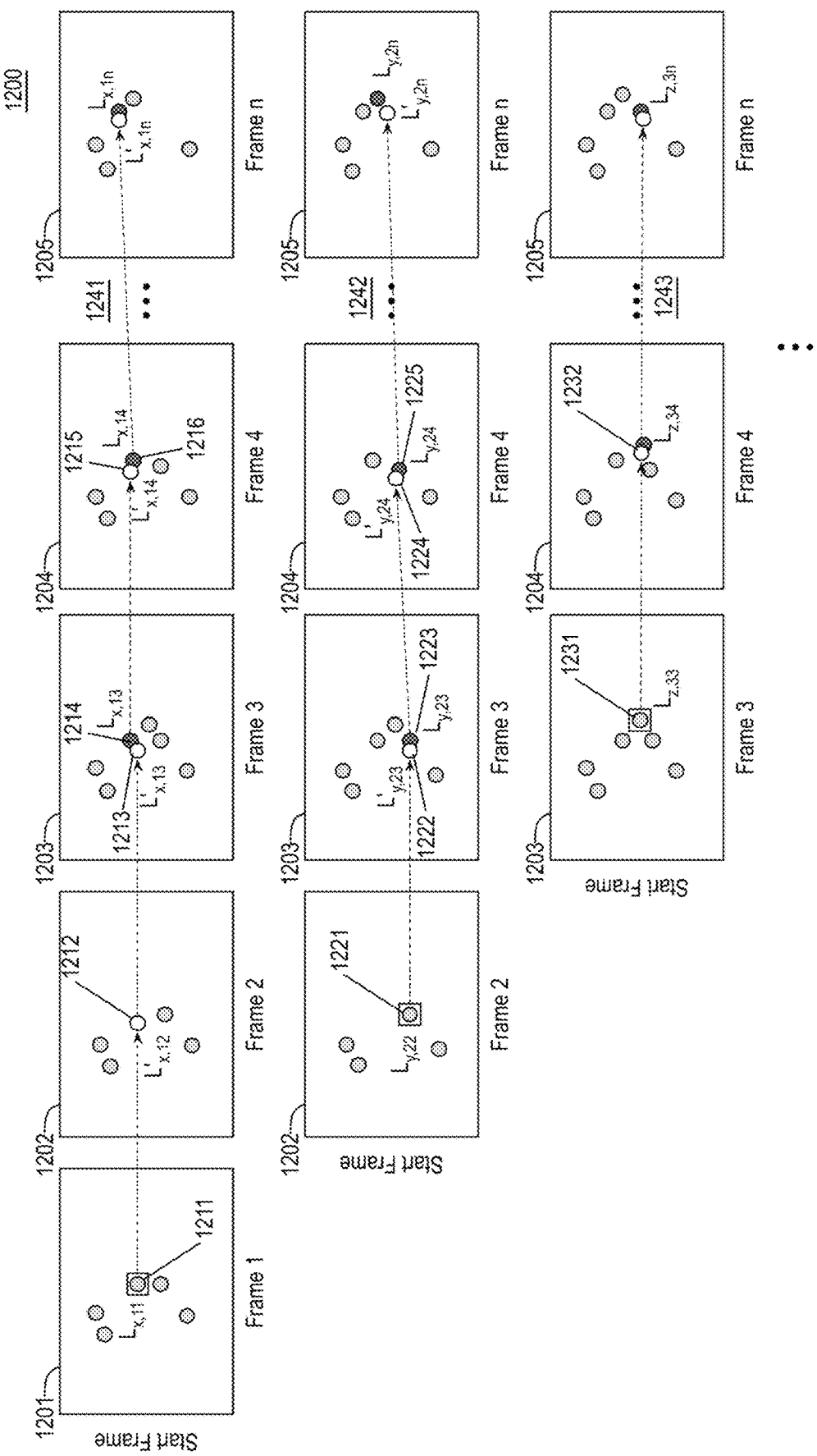
FIG. 12 illustrates exemplary tracklet generation with generation beginning at each time frame.

FIG. 12 illustrates exemplary tracklet generation 1200 with generation beginning at each time frame, arranged in accordance with at least some implementations of the present disclosure. As shown in FIG. 12, a buffer of tracking frames inclusive of frames 1201, 1202, 1203, 1204, 1205 may be maintained. The frame buffer may be any size such as 15 frames or the like. In the example of FIG. 12, each frame indicates locations of corresponding bounding boxes at a particular time instance. For example, each player dot may be an average (or other aggregation) of the locations of the players from each of the camera views at the time instance based on the bounding boxes deemed to correspond as discussed above. That is, each dot may be an average location on the ground plane in the 3D coordinate system of the locations of corresponding bounding boxes. Furthermore, with respect to tracklets a start frame is used to indicate the frame at which the tracklets were generated. Therefore a frame may be a post-start frame of a tracklet or a start frame of a tracklet.

In the context of FIG. 12, a group of tracklets is generated using a number of frames in the frame buffer as starting frames. The frames used as starting point may be every frame for example. Thereby, several groups of tracklets are generated that may be later merged or some tracklets may be discarded as the groups of tracklets are compared. That is, tracklets generated starting at frame 1 may be used as an initialization group of tracklets. Then, tracklets generated starting at frame 2 are compared to those generated starting at frame 1 and some tracklets may be discarded, added, or merged with respect to the initialization group of tracklets. Tracklets generated starting at frame 3 are compared to those preceding tracklets (as tracked using a correspondence list)

and some tracklets may again be discarded, added, or merged, and so on. Such techniques are discussed further herein below.

Therefore, groups of tracklets are generated from each frame as a starting frame. Given $L_i$ associated players in a frame i, the location correspondence in subsequent frames may be generated using any suitable technique or techniques such as application of a combinational optimization algorithm inclusive of the Hungarian algorithm. For example, the location of a player x in start frame s may be represented as $L_{ss}^x$ and a correspondence location in a subsequent frame t may be represented as $L_{st}^x$. Based on such locations, a velocity $V_t^x$ of the player x in frame t may determined as shown in Equation (6):

$$V_{st}^x = (L_{st}^x - L_{ss}^x)/(t-s) \qquad (6)$$

The predicted location in frame t+1 is then $L_{s(t+1)}^{x'} = L_{st}^x + V_{st}^x \times 1$, which used to find a real location $L_{s(t+1)}^x$ of player x using the Hungarian algorithm for example. Furthermore, a distance threshold, $\varepsilon$, is used to select a best location pair. For example, given a distance d in a location pair selected using the Hungarian algorithm, only a pair satisfying a distance constraint of d<$\varepsilon$ is selected. If no pairing meets the threshold, a location may be added to the frame. Repeating such processing, correspondences in each frame buffer are generated for all players beginning with the first frame in the buffer. Similarly, all player correspondences are generated beginning from frame 2, from frame three and so on to generate groups of tracklets beginning at each frame.

With reference to FIG. 12, beginning with start frame 1201, a player location 1211 indicated by $L_{x,11}$ (location of player x based on start frame 1 in frame 1) is shown. It is noted that the processing discussed with respect to player location 1211 is performed in parallel for the other four player locations in start frame 1201. A predicted location 1212 of the player is generated in frame 1202 as discussed with respect to Equation (6) and is indicated by $L'_{x,12}$ (location, predicted, of player x based on start frame 1 in frame 2). In this example, no actual location corresponds to predicted location 1212 and the location may be added to the tracklet. Next, a predicted location 1213 of the player is generated as discussed with respect to Equation (6) and is indicated by $L'_{x,13}$ (location, predicted, of player x based on start frame 1 in frame 3). Based on application of the Hungarian algorithm and distance threshold, actual player location 1214 is selected and added to the tracklet for player location 1211. Processing continues with generation of a predicted location 1215 of the player is generated as discussed with respect to Equation (6) and as indicated by $L'_{x,14}$ (location, predicted, of player x based on start frame 1 in frame 4). Based on application of the Hungarian algorithm and distance threshold, actual player location 1216 is selected and added to the tracklet for player location 1211. Such processing continues through frame n such that a tracklet 1241 is generated for player location 1211. As discussed, beginning at start frame 1201, five tracklets including tracklet 1241 are generated.

Similarly, beginning with start frame 1202, a player location 1221 indicated by $L_{x,22}$ (location of player y based on start frame 2 in frame 2) is shown. As above, the processing discussed with respect to player location 1221 is performed in parallel for the other three player locations in start frame 1202. Notably, as a player location corresponding to player location 1211 is not found in start frame 1202, no corresponding tracklet will be generated. A predicted location 1222 of the player is generated in frame 1203 is indicated by $L'_{y,23}$ (location, predicted, of player y based on start frame 2 in frame 3). Based on application of the Hungarian algorithm and distance threshold, actual player location 1223 ($L_{y,23}$) is selected and added to the tracklet for player location 1222. Processing continues with generation of a predicted location 1224 of the player as indicated by $L'_{y,24}$ (location, predicted, of player y based on start frame 2 in frame 4). Based on application of the Hungarian algorithm and distance threshold, actual player location 1225 ($L_{y,24}$) is selected and added to the tracklet for player location 1211. Such processing continues through frame n such that a tracklet 1242 is generated for player location 1221. For example, beginning at start frame 1202, four tracklets including tracklet 1242 are generated.

Such processing continues with any number of start frames as shown with respect to start frame 1203 where a player location 1231 indicated by $L_{z,33}$ (location of player z based on start frame 3 in frame 3) is shown. Processing as discussed above is employed to generate a tracklet 1243 for player location 1231 inclusive of player location 1234 ($L_{z,34}$). For example, beginning at start frame 1203, six tracklets including tracklet 1243 are generated.

With reference to FIG. 3, after generation of such tracklets, location tracking in continuous frames module 302 performs tracklet fusion operations to provide robust player tracking. For example, after location correspondence building, each player in frame i has a correspondence list $C_i^x = \{\alpha L_{it}^x | t \in \{i, i+1, \ldots, n\}, \alpha \in \{0,1\}\}$ that stores all the correspondence locations found in the later frames. Here, n represents the last frame in buffer, $\alpha$ is the correspondence coefficient with $\alpha=0$ indicating no correspondence in the frame and $\alpha=1$ indicating correspondence in the frame. As shown in FIG. 12, the bounding box association result (player locations $L_i$) in frame 1, 2, 3 are not necessary stable. For example, five tracklets are generated when beginning at frame 1, four tracklets are generated when beginning at frame 2, six tracklets are generated when beginning at frame 3, and so on. Using the following techniques, tracklets (as indicated by player lists) are merged or deleted for improved robustness in the final association lists and player tracking. That is, tracklet merger and deletion are used to provide player lists $C_i^x$ in frame i such that the player location can be stable across time instances in the buffers.

In some embodiments, for each player in frame i, the intersection of $C_i^x$ and $C_a$ is iteratively determined, where $C_a$ represents a combined list of selected correspondence lists and $C_a^j$ represents one player list in $C_a$, $C_a = \{C_a^j | j = 1, 2, \ldots\}$. For each tracklet or player list in each frame, the following processing is performed. First, if the length of $C_i^x$ (i.e., the frame length of the player list)) is less than one third of the buffer size, the player list is removed directly (e.g., discarded). If $C_i^x \cap C_a^j = \emptyset$ (i.e., the tracklet or player list is not in the combined list) and the length of $C_i^x$ plus the length of $C_a^j$ is less equal than the buffer size, $C_i^x$ is merged into $C_a^j$ (i.e., the player list is merged into the prior player list to form a combined tracklet). If $C_i^x \cap C_a^j = \emptyset$ and the length of $C_i^x$ plus the length of $C_a^j$ is greater than or equal to the buffer size, $C_i^x$ is added into $C_a$ (i.e., the tracklet or player list is added as an entry into the combined list). Otherwise, $C_i^x$ is removed or discarded. After such tracklets merging and deleting, a cubic spline interpolation is performed to complete any lost player location in frames in which a player is not already detected to complete each tracklet, as needed. Such techniques are illustrated with respect to FIGS. 13 and 14.

Figure 13:
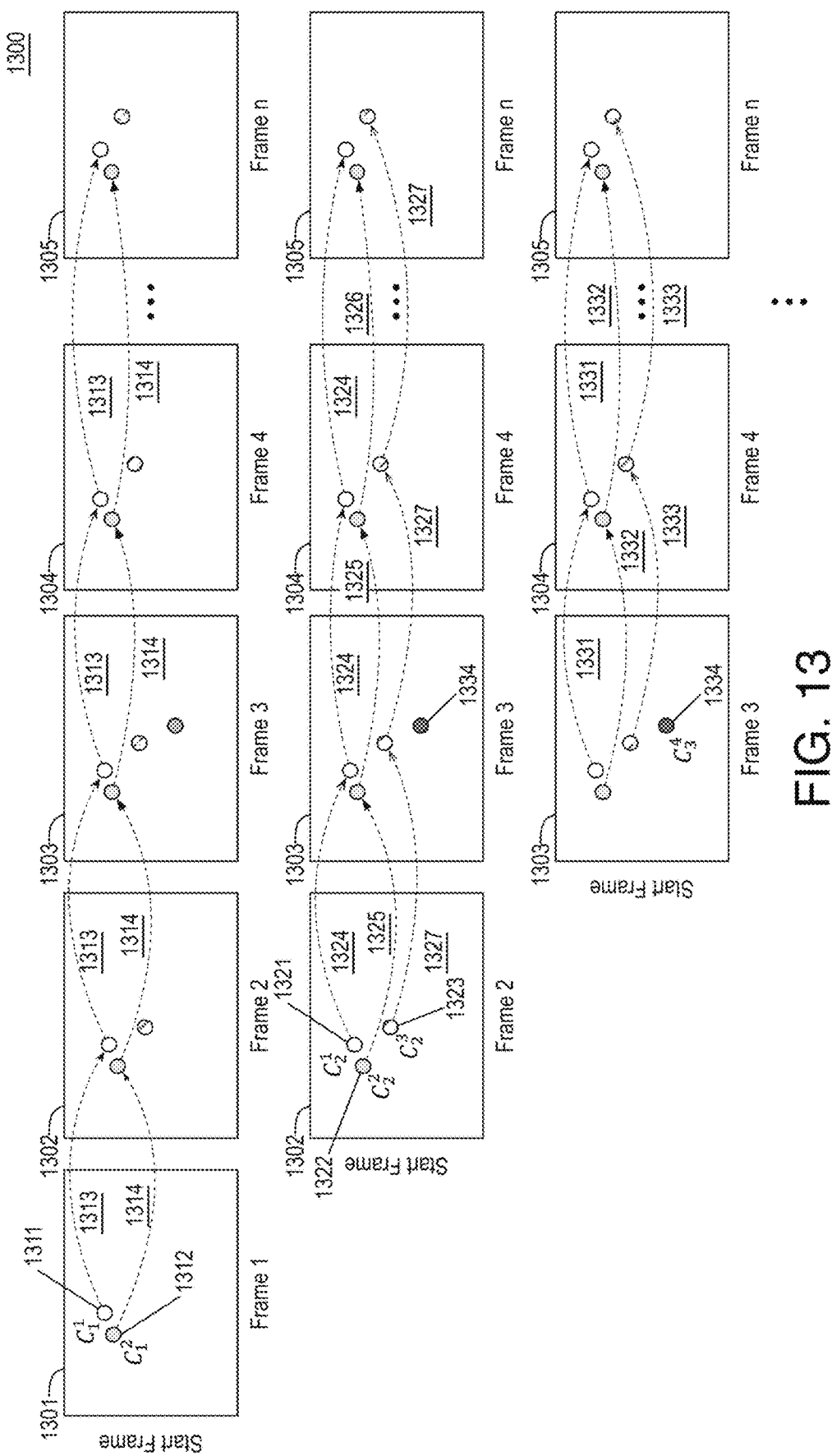
FIG. 13 illustrates exemplary tracklet fusion.

FIG. 13 illustrates exemplary tracklet fusion 1300, arranged in accordance with at least some implementations of the present disclosure. As shown in FIG. 13, for each of frames 1301, 1302, 1303, 1304, 1305, tracklet sets have been generated beginning from each of such frames. For example, tracklet 1313 has been generated for player 1311 (labeled $C_1^1$ indicating player 1 with start frame 1) and tracklet 1314 has been generated for player 1312 (labeled $C_1^2$ indicating player 2 with start frame 1) beginning with frame 1301. Beginning with frame 1302, tracklet 1324 has been generated for player 1321 (labeled $C_2^1$ indicating player 1 with start frame 2), tracklet 1325 has been generated for player 1322 (labeled $C_2^2$ indicating player 2 with start frame 2), and tracklet 1327 has been generated for player 1323 (labeled $C_2^3$ indicating player 3 with start frame 2). Furthermore, beginning with frame 1303, tracklets 1331, 1332, 1333 have been generated as discussed. Finally, a player 1334 has been identified in frame 1303, which has a tracklet of a single frame.

Figure 14:
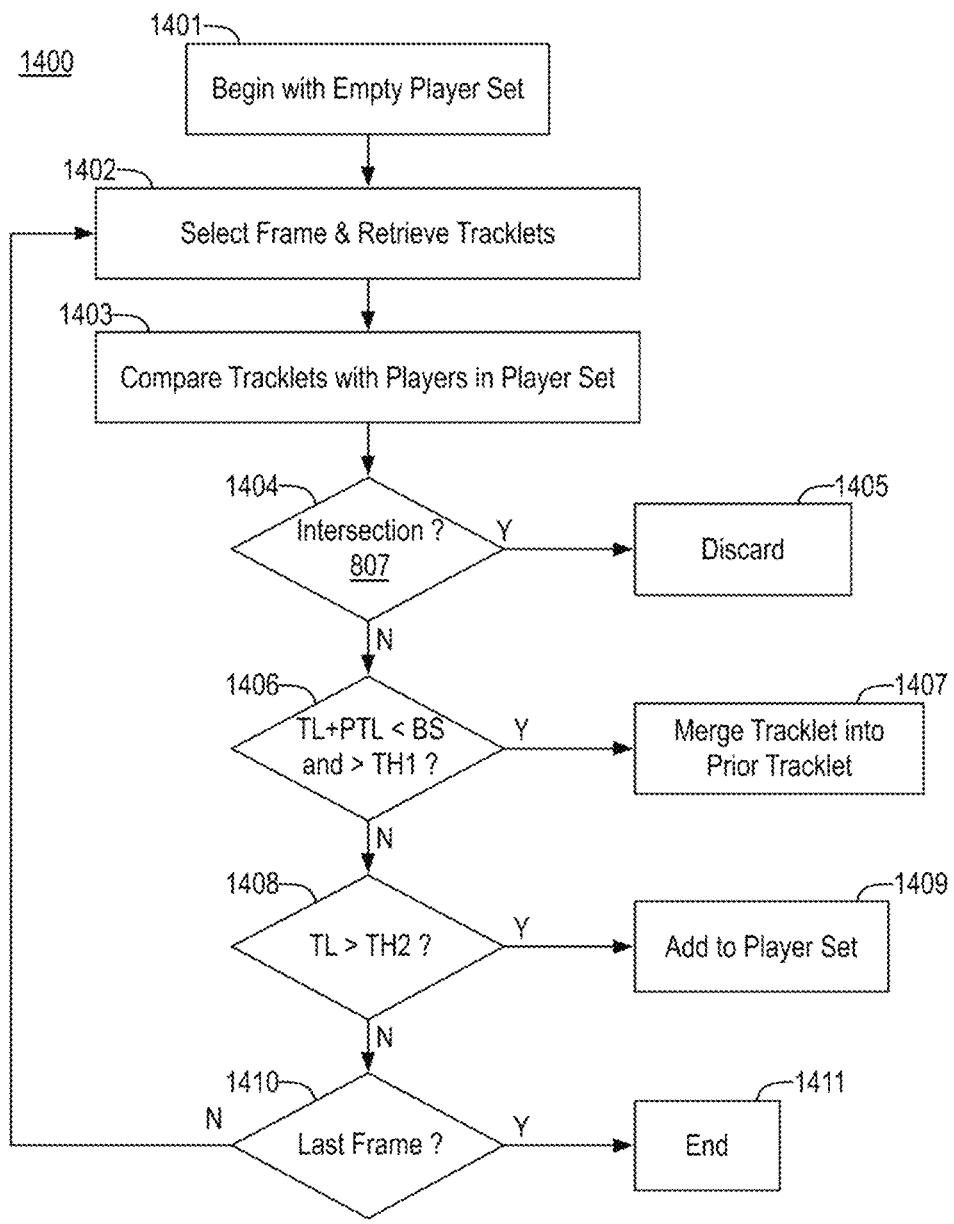
FIG. 14 illustrates an example process for performing tracklet fusion.

FIG. 14 illustrates an example process 1400 for performing tracklet fusion, arranged in accordance with at least some implementations of the present disclosure. Process 1400 may include one or more operations 1401-1411 as illustrated in FIG. 14. For example, operations 1401-1411 may be performed by location tracking in continuous frames module 302.

Processing begins at operation 1401 where an empty player set ($C_a$) is generated. The resultant filled player set will indicate the player and bounding box correspondence across continuous frames or time instances as discussed herein. Processing continues at operation 1402, where a frame is selected (in temporal order) and the tracklets or player lists generated using the frame as a start frame are retrieved. For example, for frame 1301 as a start frame, tracklets 1313, 1314 are retrieved, for frame 1302 as a start frame, tracklets 1324, 1325, 1327 are retrieved, for frame 1303 as a start frame, tracklets 1331, 1332, 1333, 1334 are retrieved, and so on.

Processing continues at operation 1403, where the tracklets for the frame are compared with the players in the player set. Processing continues at decision operation 1404 where a determination is made, for each of the tracklets, whether the player location in the current frame is in any of the tracklets (player locations) already in the player set. Here, intersection indicates two tracklets share the same location in the same frame). If so, the tracklet or player location is not added to the overall player set and instead the tracklet is discarded as redundant at operation 1405. If no intersection is found, processing continues at decision operation 1406 where a determination is made, for each of the tracklets having no intersection, whether a sum of a length of the tracklet ($C_i^x$), tracklet length TL, and a tracklet already existing in the overall player set ($C_a^j$), prior tracklet length PTL, is less than the buffer size and greater than a threshold length (e.g., half the buffer size), then the current tracklet and the prior tracklet in the overall player set are merged at operation 1407.

If not, processing continues at decision operation 1408, where a determination is made as to whether a length of the unmerged tracklet having no intersection (and therefore having no intersection with all players in the overall player set) has a length greater than a threshold TH2 (e.g., one third of the buffer size). If so the tracklet is added, as a new player, to the overall player set at operation 1409. If not, the tracklet is not added (i.e., it is discarded) and processing continues at operation 1410, where a determination is made as to whether the last frame for processing has been selected. If so, processing ends at operation 1411. If not, processing continues at operation.

The operations of process 1400 are now illustrated with respect to FIG. 13. Processing begins with an initially empty player set ($C_a$) such that the player set is to store any number of unique player tracklets. As discussed, processing continues with comparison of new tracklets ($C_i^x$) with each player ($C_a^j$) in the player set. If an intersection is found (such that the player position in the new tracklet in the current frame finds a matching player position for one of the players), the new tracklet is not added to the player set. If no intersection is found and the length of the new tracklet and any existing player tracklet ($C_i^x + C_a^j$) is smaller than the buffer size and larger than a threshold, the new tracklet ($C_i^x$) and the existing player tracklet ($C_a^j$) are merged to update the existing player tracklet ($C_a^j$) in the player set ($C_a$). If there is no such merging with any existing player tracklet (e.g., no combining with any player in the player set) and the length of the new tracklet ($C_i^x$) exceeds a threshold, then the new tracklet ($C_i^x$) is added to the player set ($C_a$).

For example, processing begins with an empty player set ($C_a$). Then beginning with start frame 1301, tracklet 1313 ($C_1^1$) is compared with the tracklets in the player set ($C_a$). As player set ($C_a$) is empty, meaning tracklet 1313 ($C_1^1$) has no intersection with any player in player set ($C_a$), and tracklet 1313 ($C_1^1$) has a length larger than a threshold (at operation 1408), tracklet 1313 ($C_1^1$) is added to player set ($C_a$).

Similarly, tracklet 1314 ($C_1^2$) is compared with the tracklets in the player set ($C_a$). As player set ($C_a$) only contains tracklet 1313 ($C_1^1$), tracklet 1314 ($C_1^2$) has no intersection with any player in player set ($C_a$) (with intersection meaning two tracklets share a same location in the same frame). Furthermore, tracklet 1314 ($C_1^2$) has a length larger than a threshold (e.g., a threshold of 5 frames). Therefore, tracklet 1314 ($C_1^2$) is added to player set ($C_a$).

Moving now to frame 1302, tracklet 1324 ($C_2^1$) is evaluated. As shown, tracklet 1324 ($C_2^1$) intersects with tracklet 1313 ($C_1^1$). Therefore, tracklet 1324 ($C_2^1$) is discarded (at operation 1405). Similarly, tracklet 1325 ($C_2^2$) intersects with second tracklet 1314 ($C_1^2$) and fourth tracklet 1325 ($C_2^2$) is also discarded.

Next, tracklet 1327 ($C_2^3$) is processed. Currently, player set ($C_a$) includes tracklet 1313 ($C_1^1$) and tracklet 1314 ($C_1^2$). As illustrated, tracklet 1327 ($C_2^3$) has no intersection with tracklet 1313 ($C_1^1$) or tracklet 1314 ($C_1^2$). Furthermore, tracklet 1327 ($C_2^3$) has a length larger than a threshold (e.g., a threshold of 5 frames). Therefore, tracklet 1327 ($C_2^3$) is added to player set ($C_a$).

Moving now to frame 1303, tracklets 1331, 1332, 1333 intersect with tracklets 1313, 1314, 1327 as discussed and are therefore discarded. Tracklet 1327 ($C_3^4$) is then evaluated. Notably, single frame tracklets may be generated as discussed herein. Currently, player set ($C_a$) includes tracklet 1313 ($C_1^1$), tracklet 1314 ($C_1^2$), and tracklet 1327 ($C_2^3$). As shown, tracklet 1327 ($C_3^4$) does not have intersection with any of tracklet 1313 ($C_1^1$), tracklet 1314 ($C_1^2$), and tracklet 1327 ($C_2^3$). However, the length of tracklet 1327 ($C_3^4$) is less than the threshold (e.g., a threshold of 5 frames) and therefore, tracklet 1327 ($C_3^4$) is discarded.

Returning to FIG. 3, bounding box correspondence build module 301 and location tracking in continuous frames module 302 produce bounding box association results for each frame from multi camera views and the player locations in each frame. As discussed, to get a stable player location and player number, merger, interpolate, and deletion of players is performed to refine the associated player locations. Therefore, the current player locations may not match the association results due to association error and new location interpolation. To address such issues, large distance removal and adjacent player bounding box rearrangement are used to refine the association results via post processing module 303. Notably, post processing module 303 performs rearrangement and distance removal to provide final association list(s) 122.

Figure 15:
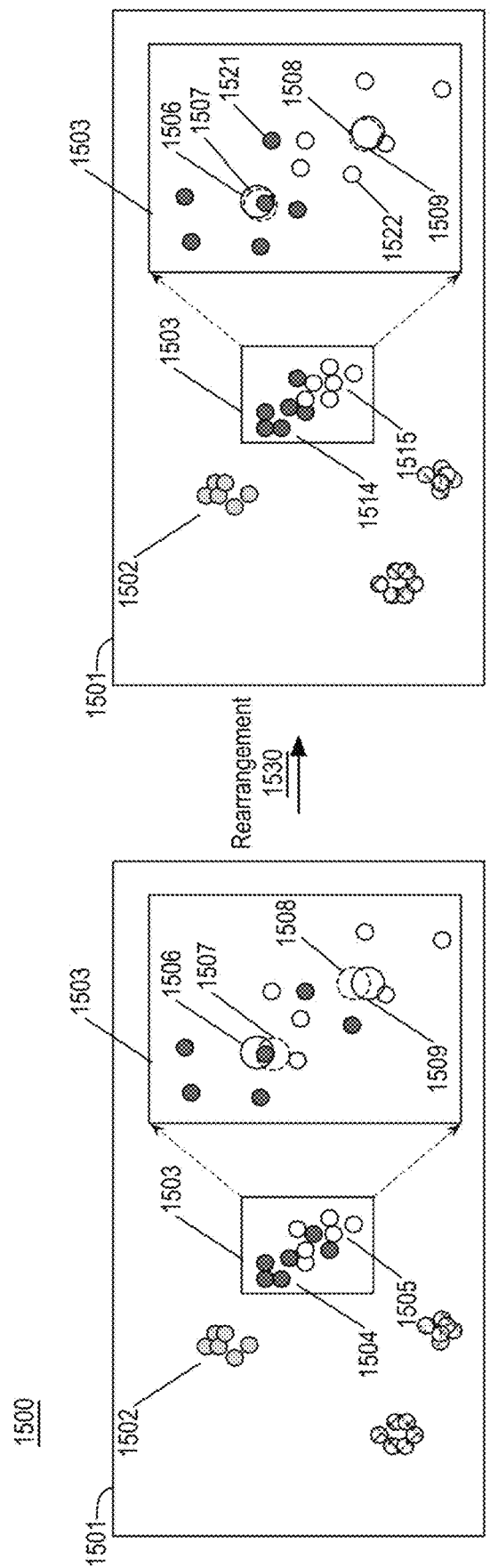
FIG. 15 illustrates an exemplary player rearrangement or reassignment processing.

FIG. 15 illustrates an exemplary player rearrangement or reassignment processing 1500, arranged in accordance with at least some implementations of the present disclosure. In FIG. 15, in a particular frame 1501, bounding box or player locations from multiple views are illustrated such that corresponding players having matching dot colors or patterns. For example, player locations 1502 are all from the same player and are grouped in a tight pattern indicating accurate player association results. Similar results are found for other player locations outside of region of interest 1503, which is also shown in an expanded view for clarity of presentation. As shown, first player locations 1504 (indicated by dark shaded dots) are intermingled with second player locations 1504 (indicated by white dots).

Furthermore, hatched circle 1507 indicates a center of first player locations 1504 after bounding box correspondence build (and prior to any adjustments due to location tracking in multi-frames) and solid circle 1506 indicates a center for the first player after location tracking in the multi-frames. Similarly, hatched circle 1508 indicates a center of second player locations 1505 after bounding box correspondence build (and prior to any adjustments due to location tracking in multi-frames) and solid circle 1509 indicates a center for the second player after location tracking in the multi-frames.

In FIG. 15, a mismatch in player location, possibly due to tracklet fusion, is evident with respect to first player locations 1504 and second player locations 1505. Notably, association error is common when players are very close to each other. To resolve such issues, a distance threshold is employed to select player in a crowd of players and to provide association refinement. In some embodiments, given a distance threshold δ, for frame 1501 pair-wise distances are determined between all player positions in the frame. If the distance $d_{ij}$ between locations i and j is less than the threshold (e.g., satisfies $d_{ij}<δ$), then the pair is added to a candidate list. The association bounding box listing is then rearranged for such candidate list locations. For each foot point, the distance to new association centers (e.g., averages of positions of each candidate player). The player position (or foot point) is then added to or belongs to the association center that has a minimum distance value. It is noted that, for each association center, one camera view has only one foot point. If two foot points have a smallest distance to one association center, the foot point with the larger distance (as compared between the two foot point to association center distances) is moved to the other association center, and so on.

For example, as shown with respect to rearrangement operation 1530 of FIG. 15, player locations 1502 are likely to be added to the same candidate list and the have a minimum distance to a corresponding association center (not shown) and therefore, no rearrangement occurs for player locations 1502. In region of interest 1503, first player locations 1504 and second player locations 1505 are added to the same candidate lists and then are rearranged as closest to corresponding association centers to generate first player locations 1514 and second player locations 1515 having different players assigned to such locations. As shown, such rearrangement operation 1530 swaps the player identification of player position 1521 (changing from second player to first player) and player position 1522 (changing from first player to second player) as well as others. Such techniques provide more robust bounding box correspondence for the video frames of time instance or frame 1501.

Figure 16:
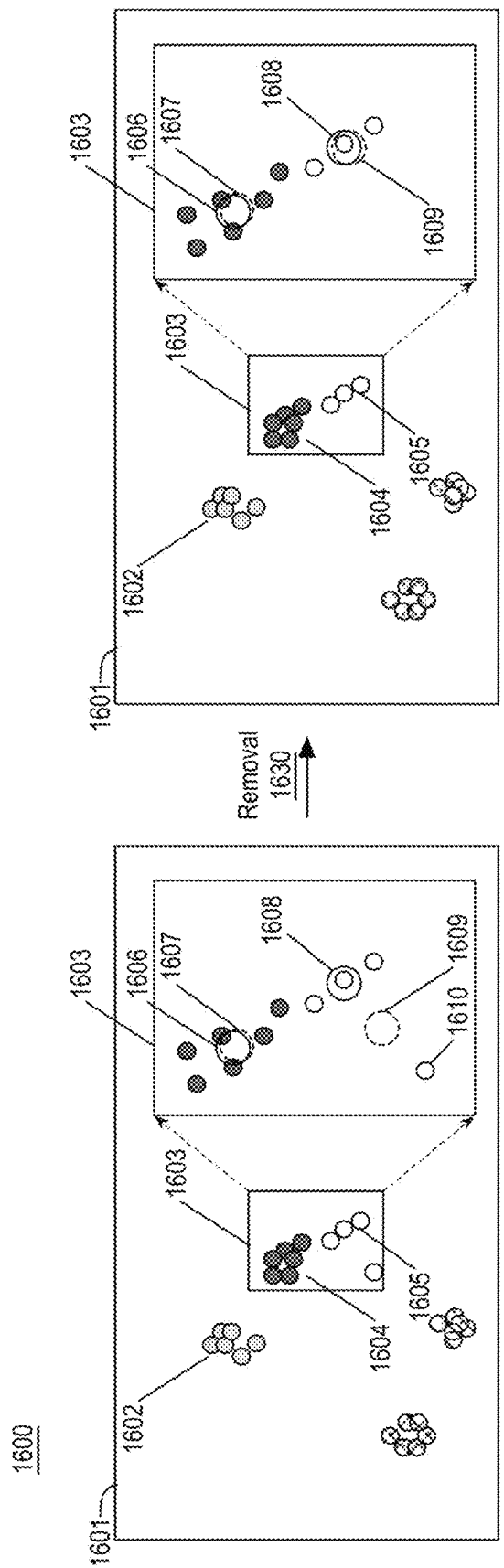
FIG. 16 illustrates an exemplary player removal due to large distance processing.

FIG. 16 illustrates an exemplary player removal due to large distance processing 1600, arranged in accordance with at least some implementations of the present disclosure. In FIG. 16, in a particular frame 1601, bounding box or player locations from multiple views are again illustrated such that corresponding players having matching dot colors or patterns. For example, player locations 1602 are all from the same player and are grouped in a tight pattern indicating accurate player association results. In region of interest 1603, which is shown in an expanded view; first player locations 1504 are also tightly grouped. However, second player locations 1605 include a player location 1610, which is dissociated from others in the group. Notably, hatched circle 1607, which indicates a center of first player locations 1604 after bounding box correspondence build (and prior to any adjustments due to location tracking in multi-frames) and solid circle 1606, which indicates a center for the first player after location tracking in the multi-frames, have similar or the same locations. However, hatched circle 1608, indicates a center of second player locations 1605 after bounding box correspondence build (and prior to any adjustments due to location tracking in multi-frames) and solid circle 1609, which indicates a center for the second player after location tracking in the multi-frames, are distanced apart due to outlier player location 1610.

In some embodiments, for each player location in a grouping, a distance from the player location to the association center (e.g., the average position of all corresponding bounding boxes after correspondence build but prior to adjustments due to location tracking in multi-frames) is compared to a threshold. If the distance is less than the threshold, the player location is kept in the grouping. If the distance exceeds the threshold, the player location is discarded as a false identification as shown with respect to removal operation 1630. In some embodiments, foot points having a large distance to their associated center are discarded. In some embodiments, foot points having a large distance to all association centers are discarded. For example, a foot point may be moved to another association center.

For example, to keep player location stable and accurate, foot points that are far away from other associated foot points (e.g., as measured using the association center) are removed. Foot points that have a large distance to other foot points are isolated points that are typically caused by wrong association or misdetection of a player (e.g., a bounding box containing several players). Such points, if not discarded, cause jittering of the player location.

Figure 17:
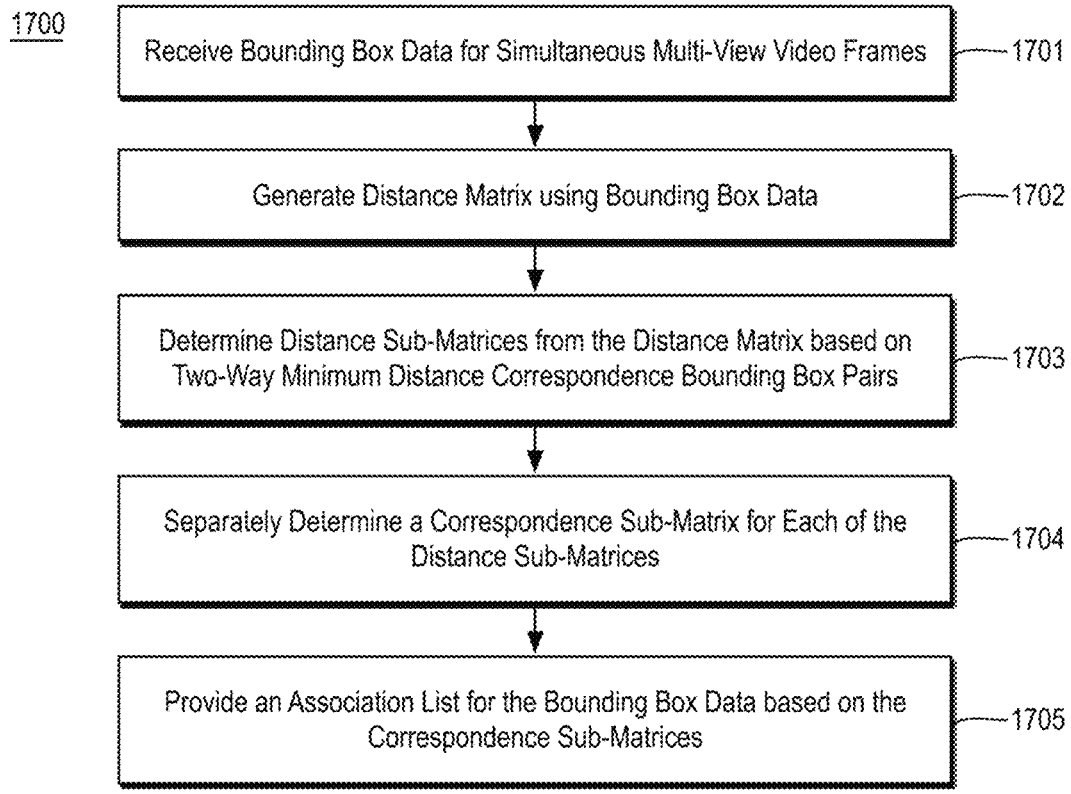
FIG. 17 is a flow diagram illustrating an example process for performing object association in multi-view video.

FIG. 17 is a flow diagram illustrating an example process 1700 for performing object association in multi-view video, arranged in accordance with at least some implementations of the present disclosure. Process 1700 may include one or more operations 1701-1705 as illustrated in FIG. 17. Process 1700 may form at least part of an object association process for multi-view video, for example. By way of non-limiting example, process 1700 may form at least part of a process as performed by system 100 as discussed herein. Furthermore, process 1700 will be described herein with reference to system 1800 of FIG. 18.

Figure 18:
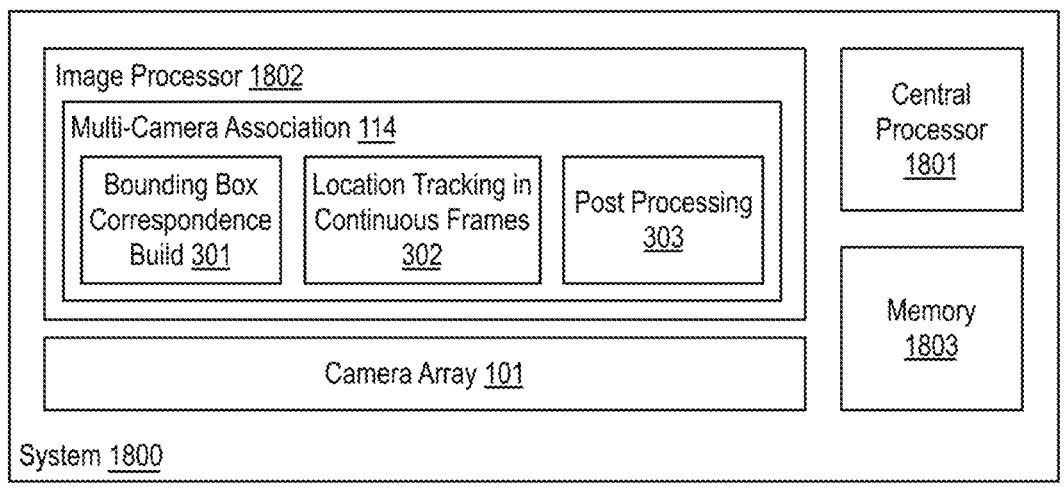
FIG. 18 is an illustrative diagram of an example system for performing object association in multi-view video.

FIG. 18 is an illustrative diagram of an example system 1800 for performing object association in multi-view video, arranged in accordance with at least some implementations of the present disclosure. As shown in FIG. 18, system 1800 includes a central processor 1801, an image processor 1802, a memory 1803, and camera array 101. Also as shown, image processor 1802 may include or implement multi-camera association module 114 inclusive of bounding box correspondence build module 301, location tracking in continuous frames module 302, and post processing module 303. In the example of system 1800, memory 1803 may store video frames, bounding box data, object or player location data, association list data, or any other data discussed herein.

As shown, in some examples, one or more or portions of multi-camera association module 114 inclusive of bounding box correspondence build module 301, location tracking in continuous frames module 302, and post processing module 303 are implemented via image processor 1802. In other examples, one or more or portions of multi-camera association module 114 inclusive of bounding box correspondence build module 301, location tracking in continuous frames module 302, and post processing module 303 are implemented via central processor 1801, an image processing unit, an image processing pipeline, an image signal processor, or the like. In some examples, one or more or portions of multi-camera association module 114 inclusive of bounding box correspondence build module 301, location tracking in continuous frames module 302, and post processing module 303 are implemented in hardware as a system-on-a-chip (SoC). In some examples, one or more or portions of multi-camera association module 114 inclusive of bounding box correspondence build module 301, location tracking in continuous frames module 302, and post processing module 303 are implemented in hardware via a FPGA.

Image processor 1802 may include any number and type of image or graphics processors or processing units that may provide the operations as discussed herein. Such operations may be implemented via software or hardware or a combination thereof. For example, image processor 1802 may include circuitry dedicated to manipulate and/or analyze frames or frame data obtained from memory 1803. Central processor 1101 may include any number and type of processors, processing units, or modules that may provide control and other high level functions for system 1800 and/or provide any operations as discussed herein. Memory 1803 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1803 may be implemented by cache memory. In an embodiment, one or more or portions of multi-camera association module 114 inclusive of bounding box correspondence build module 301, location tracking in continuous frames module 302, and post processing module 303 are implemented via an execution unit (EU) of image processor 1802. The EU may include, for example, programmable logic or circuitry such as a logic core or cores that may provide a wide array of programmable logic functions. In an embodiment, one or more or portions of multi-camera association module 114 inclusive of bounding box correspondence build module 301, location tracking in continuous frames module 302, and post processing module 303 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 17, process 1700 begins at operation 1701, where bounding box data for each of a plurality of video frames is received such that each of the plurality of video frames correspond to a particular view of a scene at a same time instance. For example, the video frames may be synchronized video frames such that they attain simultaneous or nearly simultaneous vide frames or video images of a scene such as a sporting event. The techniques discussed herein provide correspondence across the video frames at the same time instance as well as across time instances for sets of video frames. Such time instances are also referred to herein as time frames or simply frames.

Processing continues at operation 1702, where a distance matrix is generated based on the bounding box data such that the distance matrix includes distances between available combinations of bounding boxes between all pairs of the video frames. For example, the distance may be generated by pairing the video frames in all pair-wise combinations and entering a distance value for each combination of bounding boxes between the frames and repeating such distance values for all pairs of the video frames.

Processing continues at operation 1703, where distance sub-matrices are determined from the distance matrix based on two-way minimum distance correspondence bounding box pairs within the distance matrix. For example, such two-way minimum distance correspondences indicate that for a first bounding box in a first frame, a second bounding box in a second frame is the minimum distance bounding box and for the second bounding box, the first bounding box is also the minimum distance bounding box. In some embodiments, a first two-way minimum distance correspondence bounding box pair of the two-way minimum distance correspondence bounding box pairs includes a correspondence between a first bounding box in a first video frame and a second bounding box in a second video frame, such that the first two-way minimum distance correspondence bounding box pair is responsive to the second bounding having a minimum distance from the first bounding box from all available distances from the first bounding box to all candidate bounding boxes in the second video frame and the first bounding having a minimum distance from the second bounding box from all available distances from the second bounding box to all candidate bounding boxes in the first video frame.

Furthermore, the distance sub-matrices are smaller than the original distance matrix and are generated by reorganizing rows and columns of the original distance matrix and then segmenting out the sub-matrices. In some embodiments, determining the sub-matrices includes transforming the distance matrix based on the two-way minimum distance correspondence bounding box pairs via row and column elementary transforms to merge the two-way minimum distance correspondence bounding box pairs within the sub-matrices.

Processing continues at operation 1704, where a correspondence sub-matrix is determined, separately, for each of the distance sub-matrices based on optimizing an object function including each correspondence sub-matrix and each distance sub-matrix. For example, the object function may include a sum of inner products of the distance sub-matrix and the correspondence sub-matrix summed with a product of a low rank constraint and a rank of the correspondence sub-matrix.

Processing continues at operation 1705, where an association list is provided for the bounding box data of the video frames based on the correspondence sub-matrices. The association list may include any suitable data structure that indicates correspondences between the bounding boxes across the video frames. For example, a first index may be provided for a first object or player and the association list may include a frame number and bounding box number for each bounding box that corresponds to the first index, the same may be provided for a second index, and so on. Alternatively, an index may be affixed to each bounding box indicating the object or player that corresponds to the bounding box. Other techniques for indicating such association or correspondence are available.

Furthermore, association lists for temporally adjacent sets of video frames (e.g., time instances) may be used to generate object or player tracking. Furthermore, the object or player tracking, via sets of tracklets, may be used to update or alter the association lists. In some embodiments, process 1700 further includes generating a first set of tracklets using the same time instance as a starting time frame, generating one or more additional sets of tracklets using additional time instances subsequent to the same time instance as starting time frames, and adjusting an initial association list for one of the time instances using the first set of tracklets and the additional sets of tracklets. In some embodiments, a first tracklet of the first set of tracklets is generated by projecting positions of bounding boxes for the same time instance to a second positions of the bounding boxes for a second time instance subsequent to the same time instance and adding an object position at the second time instance to the first tracklet in response to application of a combinational optimization algorithm and the object position at the second time instance being within a threshold distance of the object position at the same time instance.

In some embodiments, process 1700 further includes fusing the first set of tracklets and the one or more additional sets of tracklets to generate a resultant set of tracklets. In some embodiments, fusing the first set of tracklets and the one or more additional sets of tracklets includes determining a second tracklet in a second set of tracklets of the one or more additional sets of tracklets does not intersect with any tracklet in the first set of tracklets and adding the second tracklet to the resultant set of tracklets in response to the second tracklet having a length exceeding a threshold. In some embodiments, fusing the first set of tracklets and the one or more additional sets of tracklets includes determining a second tracklet in a second set of tracklets of the one or more additional sets of tracklets does not intersect with any tracklet in the first set of tracklets and merging the second tracklet with a third tracklet in resultant set of tracklets in response to a sum of the lengths of the second and third tracklets being less than a buffer size corresponding to the same and additional time instances.

Furthermore, after such tracklet generation and fusion, the association list or lists (having been adjusted thereby) may again be altered to correct outliers and provide greater stability. In some embodiments, providing the association list includes adjusting, after location tracking of the bounding box data, one or more objects in the association list based on comparisons of positions of objects in the association list. In some embodiments, adjusting the one or more objects includes changing an association for a first object bounding box in a first video frame from a first object association to a second object association in response to a first distance of the first object bounding box to a center location of the first object association exceeding a second distance of the first object bounding box to a center location of the second object association. In some embodiments, adjusting the one or more objects includes discarding a first object bounding box in a first video frame in response to the first object bounding box being greater than a threshold distance from a first object association position.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 19:
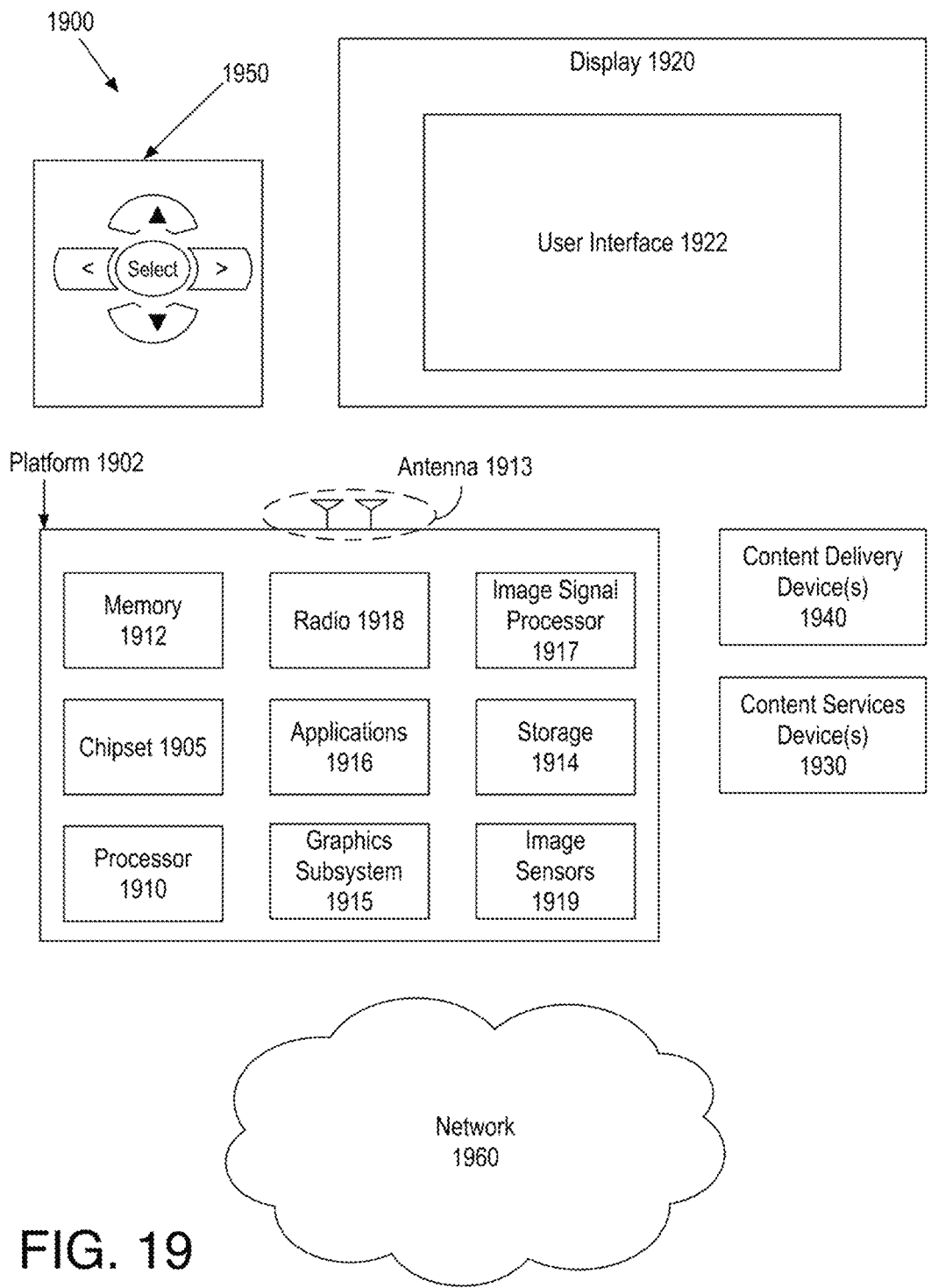
FIG. 19 is an illustrative diagram of an example system.

FIG. 19 is an illustrative diagram of an example system 1900, arranged in accordance with at least some implementations of the present disclosure. In various implementations, system 1900 may be a mobile device system although system 1900 is not limited to this context. For example, system 1900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1900 includes a platform 1902 coupled to a display 1920. Platform 1902 may receive content from a content device such as content services device(s) 1930 or content delivery device(s) 1940 or other content sources such as image sensors 1919. For example, platform 1902 may receive image data as discussed herein from image sensors 1919 or any other content source. A navigation controller 1950 including one or more navigation features may be used to interact with, for example, platform 1902 and/or display 1920. Each of these components is described in greater detail below.

In various implementations, platform 1902 may include any combination of a chipset 1905, processor 1910, memory 1912, antenna 1913, storage 1914, graphics subsystem 1915, applications 1916, image signal processor 1917 and/or radio 1918. Chipset 1905 may provide intercommunication among processor 1910, memory 1912, storage 1914, graphics subsystem 1915, applications 1916, image signal processor 1917 and/or radio 1918. For example, chipset 1905 may include a storage adapter (not depicted) capable of providing intercommunication with storage 1914.

Processor 1910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1910 may be dual-core processor(s), dual-core mobile processor(s), and so forth.

Memory 1912 may be implemented as a volatile memory device such as, but not limited to, a Random Access Memory (RAM), Dynamic Random Access Memory (DRAM), or Static RAM (SRAM).

Storage 1914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1914 may include technology to increase the storage performance enhanced protection for valuable digital media when multiple hard drives are included, for example.

Image signal processor 1917 may be implemented as a specialized digital signal processor or the like used for image processing. In some examples, image signal processor 1917 may be implemented based on a single instruction multiple data or multiple instruction multiple data architecture or the like. In some examples, image signal processor 1917 may be characterized as a media processor. As discussed herein, image signal processor 1917 may be implemented based on a system on a chip architecture and/or based on a multi-core architecture.

Graphics subsystem 1915 may perform processing of images such as still or video for display. Graphics subsystem 1915 may be a graphics processing unit (GPU) or a visual processing unit (VPU), for example. An analog or digital interface may be used to communicatively couple graphics subsystem 1915 and display 1920. For example, the interface may be any of a High-Definition Multimedia Interface, Display Port, wireless HDMI, and/or wireless HD compliant techniques. Graphics subsystem 1915 may be integrated into processor 1910 or chipset 1905. In some implementations, graphics subsystem 1915 may be a stand-alone device communicatively coupled to chipset 1905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1918 may operate in accordance with one or more applicable standards in any version.

In various implementations, display 1920 may include any television type monitor or display. Display 1920 may include, for example, a computer display screen, touch screen display, video monitor, television-like device, and/or a television. Display 1920 may be digital and/or analog. In various implementations, display 1920 may be a holographic display. Also, display 1920 may be a transparent surface that may receive a visual projection. Such projections may convey various forms of information, images, and/or objects. For example, such projections may be a visual overlay for a mobile augmented reality (MAR) application. Under the control of one or more software applications 1916, platform 1902 may display user interface 1922 on display 1920.

In various implementations, content services device(s) 1930 may be hosted by any national, international and/or independent service and thus accessible to platform 1902 via the Internet, for example. Content services device(s) 1930 may be coupled to platform 1902 and/or to display 1920. Platform 1902 and/or content services device(s) 1930 may be coupled to a network 1960 to communicate (e.g., send and/or receive) media information to and from network 1960. Content delivery device(s) 1940 also may be coupled to platform 1902 and/or to display 1920.

Image sensors 1919 may include any suitable image sensors that may provide image data based on a scene. For example, image sensors 1919 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1919 may include any device that may detect information of a scene to generate image data.

In various implementations, content services device(s) 1930 may include a cable television box, personal computer, network, telephone, Internet enabled devices or appliance capable of delivering digital information and/or content, and any other similar device capable of uni-directionally or bi-directionally communicating content between content providers and platform 1902 and/display 1920, via network 1960 or directly. It will be appreciated that the content may be communicated uni-directionally and/or bi-directionally to and from any one of the components in system 1900 and a content provider via network 1960. Examples of content may include any media information including, for example, video, music, medical and gaming information, and so forth.

Content services device(s) 1930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1902 may receive control signals from navigation controller 1950 having one or more navigation features. The navigation features of navigation controller 1950 may be used to interact with user interface 1922, for example. In various embodiments, navigation controller 1950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1950 may be replicated on a display (e.g., display 1920) by movements of a pointer, cursor, focus ring, or other visual indicators displayed on the display. For example, under the control of software applications 1916, the navigation features located on navigation controller 1950 may be mapped to virtual navigation features displayed on user interface 1922, for example. In various embodiments, navigation controller 1950 may not be a separate component but may be integrated into platform 1902 and/or display 1920. The present disclosure, however, is not limited to the elements or in the context shown or described herein.

In various implementations, drivers (not shown) may include technology to enable users to instantly turn on and off platform 1902 like a television with the touch of a button after initial boot-up, when enabled, for example. Program logic may allow platform 1902 to stream content to media adaptors or other content services device(s) 1930 or content delivery device(s) 1940 even when the platform is turned "off." In addition, chipset 1905 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1900 may be integrated. For example, platform 1902 and content services device(s) 1930 may be integrated, or platform 1902 and content delivery device(s) 1940 may be integrated, or platform 1902, content services device(s) 1930, and content delivery device(s) 1940 may be integrated, for example. In various embodiments, platform 1902 and display 1920 may be an integrated unit. Display 1920 and content service device(s) 1930 may be integrated, or display 1920 and content delivery device(s) 1940 may be integrated, for example. These examples are not meant to limit the present disclosure.

In various embodiments, system 1900 may be implemented as a wireless system, a wired system, or a combination of both. When implemented as a wireless system, system 1900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 19.

Figure 20:
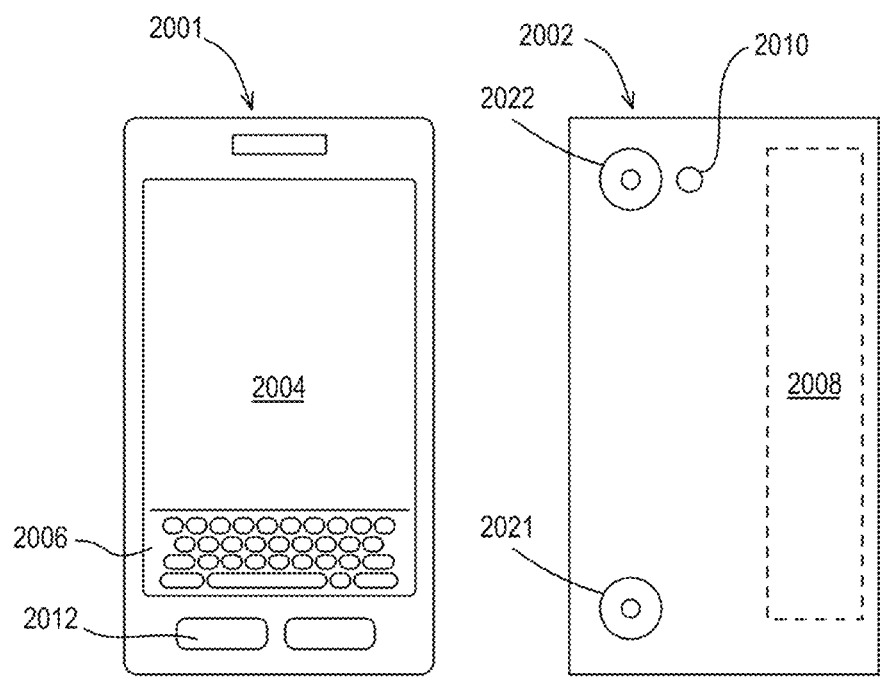
FIG. 20 illustrates an example device, all arranged in accordance with at least some implementations of the present disclosure.

As described above, system 1900 may be embodied in varying physical styles or form factors. FIG. 20 illustrates an example small form factor device 2000, arranged in accordance with at least some implementations of the present disclosure. In some examples, system 1900 may be implemented via device 2000. In other examples, other systems, components, or modules discussed herein or portions thereof may be implemented via device 2000. In various embodiments, for example, device 2000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 20, device 2000 may include a housing with a front 2001 and a back 2002. Device 2000 includes a display 2004, an input/output (I/O) device 2006, a color camera 2021, a color camera 2022, and an integrated antenna 2008. In some embodiments, color camera 2021 and color camera 2022 attain planar images as discussed herein. In some embodiments, device 2000 does not include color camera 2021 and 2022 and device 2000 attains input image data (e.g., any input image data discussed herein) from another device. Device 2000 also may include navigation features 2012. I/O device 2006 may include any suitable I/O device for entering information into a mobile computing device. Examples for I/O device 2006 may include an alphanumeric keyboard, a numeric keypad, a touch pad, input keys, buttons, switches, microphones, speakers, voice recognition device and software, and so forth. Information also may be entered into device 2000 by way of microphone (not shown), or may be digitized by a voice recognition device. As shown, device 2000 may include color cameras 2021, 2022, and a flash 2010 integrated into back 2002 (or elsewhere) of device 2000. In other examples, color cameras 2021, 2022, and flash 2010 may be integrated into front 2001 of device 2000 or both front and back sets of cameras may be provided. Color cameras 2021, 2022 and a flash 2010 may be components of a camera module to originate color image data with IR texture correction that may be processed into an image or streaming video that is output to display 2004 and/or communicated remotely from device 2000 via antenna 2008 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for performing object association in multi-view video comprises receiving bounding box data for each of a plurality of video frames, each of the plurality of video frames corresponding to a particular view of a scene at a same time instance, generating a distance matrix based on the bounding box data, the distance matrix comprising distances between available combinations of bounding boxes between all pairs of the video frames, determining a plurality of distance sub-matrices from the distance matrix based on two-way minimum distance correspondence bounding box pairs within the distance matrix, separately determining a correspondence sub-matrix for each of the distance sub-matrices based on optimizing an object function comprising each correspondence sub-matrix and each distance sub-matrix, and providing an association list for the bounding box data of the video frames based on the correspondence sub-matrices.

In one or more second embodiments, further to the first embodiment, a first two-way minimum distance correspondence bounding box pair of the two-way minimum distance correspondence bounding box pairs comprises a correspondence between a first bounding box in a first video frame and a second bounding box in a second video frame, wherein the first two-way minimum distance correspondence bounding box pair is responsive to the second bounding box having a minimum distance from the first bounding box from all available distances from the first bounding box to all candidate bounding boxes in the second video frame and the first bounding box having a minimum distance from the second bounding box from all available distances from the second bounding box to all candidate bounding boxes in the first video frame.

In one or more third embodiments, further to the first or second embodiments, determining the plurality of sub-matrices comprises transforming the distance matrix based on the two-way minimum distance correspondence bounding box pairs via row and column elementary transforms to merge the two-way minimum distance correspondence bounding box pairs within the sub-matrices.

In one or more fourth embodiments, further to any of the first through third embodiments, the method further comprises generating a first set of tracklets using the same time instance as a starting time frame, generating one or more additional sets of tracklets using additional time instances subsequent to the same time instance as starting time frames, and adjusting an initial association list for one of the time instances using the first set of tracklets and the additional sets of tracklets.

In one or more fifth embodiments, further to any of the first through fourth embodiments, a first tracklet of the first set of tracklets is generated by projecting positions of bounding boxes for the same time instance to a second positions of the bounding boxes for a second time instance subsequent to the same time instance and adding an object position at the second time instance to the first tracklet in response to application of a combinational optimization algorithm and the object position at the second time instance being within a threshold distance of the object position at the same time instance.

In one or more sixth embodiments, further to any of the first through fifth embodiments, the method further comprises fusing the first set of tracklets and the one or more additional sets of tracklets to generate a resultant set of tracklets.

In one or more seventh embodiments, further to any of the first through sixth embodiments, fusing the first set of tracklets and the one or more additional sets of tracklets comprises determining a second tracklet in a second set of tracklets of the one or more additional sets of tracklets does not intersect with any tracklet in the first set of tracklets and adding the second tracklet to the resultant set of tracklets in response to the second tracklet having a length exceeding a threshold.

In one or more eighth embodiments, further to any of the first through seventh embodiments, fusing the first set of tracklets and the one or more additional sets of tracklets comprises determining a second tracklet in a second set of tracklets of the one or more additional sets of tracklets does not intersect with any tracklet in the first set of tracklets and merging the second tracklet with a third tracklet in resultant set of tracklets in response to a sum of the lengths of the second and third tracklets being less than a buffer size corresponding to the same and additional time instances.

In one or more ninth embodiments, further to any of the first through eighth embodiments, providing the association list comprises adjusting, after location tracking of the bounding box data, one or more objects in the association list based on comparisons of positions of objects in the association list.

In one or more tenth embodiments, further to any of the first through ninth embodiments, adjusting the one or more objects comprises changing an association for a first object bounding box in a first video frame from a first object association to a second object association in response to a first distance of the first object bounding box to a center location of the first object association exceeding a second distance of the first object bounding box to a center location of the second object association.

In one or more eleventh embodiments, further to any of the first through tenth embodiments, adjusting the one or more objects comprises discarding a first object bounding box in a first video frame in response to the first object bounding box being greater than a threshold distance from a first object association position.

In one or more twelfth embodiments, a device or system includes a memory and one or more processors to perform a method according to any one of the above embodiments.

In one or more thirteenth embodiments, at least one machine readable medium includes a plurality of instructions that in response to being executed on a computing device, cause the computing device to perform a method according to any one of the above embodiments.

In one or more fourteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system comprising:
a memory to store bounding box data for a plurality of video frames, ones of the video frames corresponding to respective views of a scene at a first time instance;
instructions; and
at least one processor circuit to be programmed based on the instructions to:
generate a distance matrix based on the bounding box data, the distance matrix including distances between available combinations of bounding boxes between pairs of the video frames;
determine a plurality of distance sub-matrices from the distance matrix based on two-way minimum distance correspondence bounding box pairs within the distance matrix;
determine a plurality of correspondence sub-matrices corresponding respectively to the plurality of distance sub-matrices based on an objective function, the objective function including the plurality of correspondence sub-matrices and the plurality of distance sub-matrices; and
provide an association list for the bounding box data of the video frames, the association list based on the correspondence sub-matrices.

2. The system of claim 1, wherein a first two-way minimum distance correspondence bounding box pair of the two-way minimum distance correspondence bounding box pairs includes a correspondence between a first bounding box in a first video frame and a second bounding box in a second video frame, the first two-way minimum distance correspondence bounding box pair is based on the second bounding box having a minimum distance from the first bounding box relative to other available distances from the first bounding box to other candidate bounding boxes in the second video frame, and the first bounding box having a minimum distance from the second bounding box relative to other available distances from the second bounding box to other candidate bounding boxes in the first video frame.

3. The system of claim 1, wherein to determine the plurality of distance sub-matrices, one or more of the at least one processor circuit is to transform the distance matrix based on the two-way minimum distance correspondence bounding box pairs via row and column elementary transforms to merge the two-way minimum distance correspondence bounding box pairs within the distance sub-matrices.

4. The system of claim 1, wherein one or more of the at least one processor circuit is to:
generate a first set of tracklets using the first time instance as a starting time frame;
generate one or more additional sets of tracklets using additional time instances subsequent to the first time instance as starting time frames; and
adjust an initial association list for one of the time instances using the first set of tracklets and the one or more additional sets of tracklets.

5. The system of claim 4, wherein one or more of the at least one processor circuit is to generate a first tracklet of the first set of tracklets by:
projecting positions of bounding boxes for the first time instance to second positions of the bounding boxes, the second positions associated with a second time instance subsequent to the first time instance; and
add an object position associated with the second time instance to the first tracklet based on (i) a combinational optimization algorithm and (ii) the object position associated with the second time instance being within a threshold distance of a corresponding object position associated with the first time instance.

6. The system of claim 4, wherein one or more of the at least one processor circuit is to:
fuse the first set of tracklets and the one or more additional sets of tracklets to generate a resultant set of tracklets.

7. The system of claim 6, wherein one or more of the at least one processor circuit is to fuse the first set of tracklets and the one or more additional sets of tracklets by:
determining a second tracklet in a second set of tracklets of the one or more additional sets of tracklets does not intersect with any tracklet in the first set of tracklets; and
adding the second tracklet to the resultant set of tracklets based on the second tracklet having a length exceeding a threshold.

8. The system of claim 6, wherein one or more of the at least once processor circuit is to fuse the first set of tracklets and the one or more additional sets of tracklets by:
determining a second tracklet in a second set of tracklets of the one or more additional sets of tracklets does not intersect with any tracklet in the first set of tracklets; and
merging the second tracklet with a third tracklet in the resultant set of tracklets based on a sum of lengths of the second tracklet and the third tracklet being less than a buffer size corresponding to a combination of the first time instance and the additional time instances.

9. The system of claim 1, wherein one or more of the at least one processor circuit is to adjust, after location tracking of the bounding box data, one or more objects in the association list based on comparisons of positions of the objects in the association list.

10. The system of claim 9, wherein one or more of the at least one processor circuit is to change an association for a first object bounding box in a first video frame from a first object association to a second object association based on a first distance of the first object bounding box to a center location of the first object association exceeding a second distance of the first object bounding box to a center location of the second object association.

11. The system of claim 9, wherein one or more of the at least one processor circuit is to discard a first object bounding box in a first video frame based on the first object bounding box being greater than a threshold distance from a first object association position.

12. A method comprising:
obtaining bounding box data for a plurality of video frames, ones of the video frames corresponding to respective views of a scene at a first time instance;
generating, by at least one processor circuit programmed based on at least one instruction, a distance matrix based on the bounding box data, the distance matrix including distances between available combinations of bounding boxes between pairs of the video frames;
determining, by one or more of the at least one processor circuit, a plurality of distance sub-matrices from the distance matrix based on two-way minimum distance correspondence bounding box pairs within the distance matrix;
determining, by one or more of the at least one processor circuit, a plurality of correspondence sub-matrices corresponding respectively to the plurality of distance sub-matrices based on an objective function, the objective function including the plurality of correspondence sub-matrices and the plurality of distance sub-matrices; and
providing an association list for the bounding box data of the video frames, the association list based on the correspondence sub-matrices.

13. The method of claim 12, wherein the determining of the plurality of distance sub-matrices includes transforming the distance matrix based on the two-way minimum distance correspondence bounding box pairs via row and column elementary transforms to merge the two-way minimum distance correspondence bounding box pairs within the distance sub-matrices.

14. The method of claim 12, including:
generating a first set of tracklets using the first time instance as a starting time frame;
generating one or more additional sets of tracklets using additional time instances subsequent to the first time instance as starting time frames; and
adjusting an initial association list for one of the time instances using the first set of tracklets and the one or more additional sets of tracklets.

15. The method of claim 14, including:
fusing the first set of tracklets and the one or more additional sets of tracklets to generate a resultant set of tracklets.

16. The method of claim 12, wherein the providing of the association list includes adjusting, after location tracking of the bounding box data, one or more objects in the association list based on comparisons of positions of the objects in the association list.

17. At least one machine readable memory comprising instructions to cause at least one processor circuit to at least:
obtain bounding box data for a plurality of video frames, the video frames corresponding to respective views of a scene at a first time instance;
generate a distance matrix based on the bounding box data, the distance matrix including distances between available combinations of bounding boxes, the available combination of the bounding boxes between pairs of the video frames;
determine a plurality of distance sub-matrices from the distance matrix based on two-way minimum distance correspondence bounding box pairs within the distance matrix;
determine a plurality of correspondence sub-matrices corresponding respectively to the plurality of distance sub-matrices based on an objective function, the objective function including the plurality of correspondence sub-matrices and the plurality of distance sub-matrices; and
provide an association list for the bounding box data of the video frames, the association list based on the correspondence sub-matrices.

18. The at least one machine readable memory of claim 17, wherein to determine the plurality of distance sub-matrices, the instructions are to cause one or more of the at least one processor circuit to transform the distance matrix based on row and column elementary transforms to merge the two-way minimum distance correspondence bounding box pairs within the distance sub-matrices.

19. The at least one machine readable memory of claim 17, wherein the instructions are to cause one or more of the at least one processor circuit to perform object association in multi-view video by:
generating a first set of tracklets using the first time instance as a starting time frame;
generating one or more additional sets of tracklets using additional time instances subsequent to the first time instance as starting time frames; and adjusting an initial association list for one of the time instances using the first set of tracklets and the one or more additional sets of tracklets.

20. The at least one machine readable memory of claim 19, wherein the instructions are to cause one or more of the at least one processor circuit to:

fuse the first set of tracklets and the one or more additional sets of tracklets to generate a resultant set of tracklets.

21. The at least one machine readable memory of claim 17, wherein the instructions are to cause one or more of the at least one processor circuit to adjust, after location tracking of the bounding box data, one or more objects in the association list based on comparisons of positions of the objects in the association list.

* * * * *

UNITED STATES PATENT AND TRADEMARK OFFICE
CERTIFICATE OF CORRECTION

PATENT NO. : 12,367,675 B2  
APPLICATION NO. : 17/923883  
DATED : July 22, 2025  
INVENTOR(S) : Fang et al.

Page 1 of 1

It is certified that error appears in the above-identified patent and that said Letters Patent is hereby corrected as shown below:

In the Claims

Column 31, Line 16 Claim 8, replace "once" with -- one --

Signed and Sealed this  
Eleventh Day of November, 2025

John A. Squires  
*Director of the United States Patent and Trademark Office*